United States Patent
Geffroy

[11] 3,759,148
[45] Sept. 18, 1973

[54] PISTON AND PISTON RINGS UNIT FOR AN INTERNAL COMBUSTION ENGINE

[75] Inventor: Robert Geffroy, Neuilly-sur-Seine, France

[73] Assignee: Sealfire, Luxembourg, Germany

[22] Filed: Feb. 13, 1968

[21] Appl. No.: 705,083

[30] Foreign Application Priority Data
Feb. 17, 1967 France .............................. 6795532
June 29, 1968 France ............................ 68112517
Jan. 18, 1968 France ............................ 68136565

[52] U.S. Cl. .................... 92/160, 92/193, 92/200, 92/212, 92/248, 277/79, 277/140, 277/165, 277/170, 277/193
[51] Int. Cl. .......................................... F01b 31/10
[58] Field of Search .................... 92/158, 160, 172, 92/208, 212, 227, 248, 249, 182, 200, 251, 252; 277/58, 173, 176, 214, 192, 193

[56] References Cited
UNITED STATES PATENTS
2,202,802   5/1940   Mason .................................... 277/75
3,335,643   8/1967   Wentworth .......................... 92/182
2,194,102   3/1940   Taylor .................................... 92/182
2,656,228   10/1953  Marien .................................. 92/160

3,172,670   3/1965   Pras ................................. 277/176 X

FOREIGN PATENTS OR APPLICATIONS
228,755   6/1959   Australia ............................. 92/182

Primary Examiner—Carroll B. Dority, Jr.
Attorney—Karl W. Flocks

[57] ABSTRACT

A piston and compression and oil control piston rings unit for internal combustion engines, said unit being placed in a cylinder delimiting a combustion chamber with its head and said piston which comprises a body formed with a head and a skirt, grooves receiving said rings, oil return orifices and a central cavity, each piston ring and its groove comprising a pair of upper contiguous faces and a pair of lower contiguous faces one of said faces of each piston ring being a face assuming the main work of the piston ring, in which:
   an efficient sealing means is placed between the face of each piston ring assuming the main work of the piston ring and the contiguous face of its groove, on at least a circle adjoining the inner limit of the face of the piston ring,
   and an access means is placed on at least one important part of the area between the upper contiguous faces of each piston ring and its groove, for the pressure existing above the piston ring.

48 Claims, 35 Drawing Figures

Inventor
Robert Geffroy
By
Karen W. Flocks
Attorney

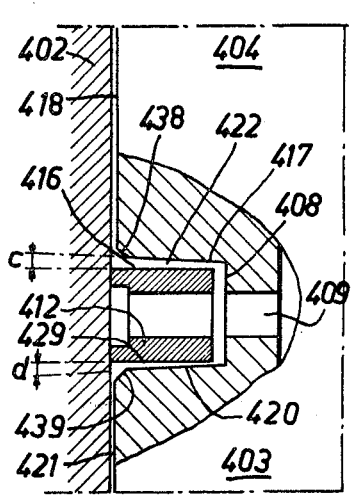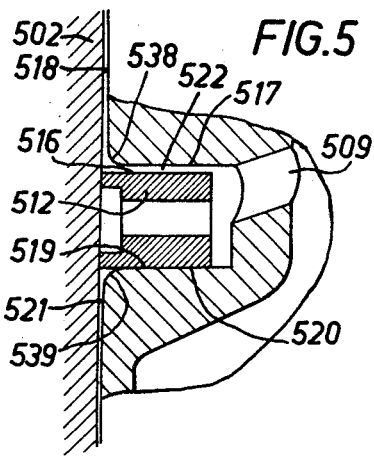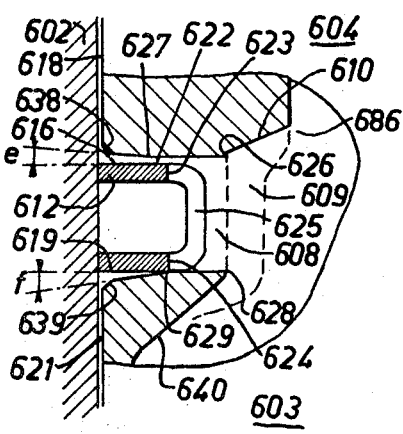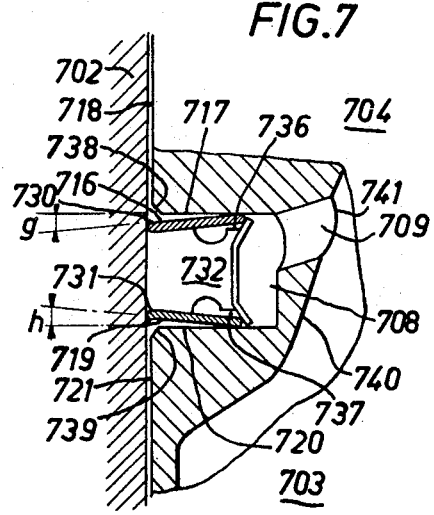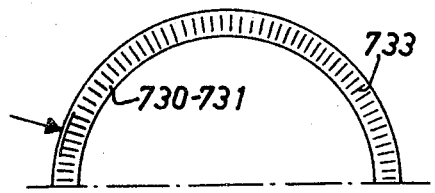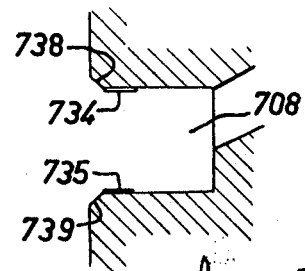

PISTON AND PISTON RINGS UNIT FOR AN INTERNAL COMBUSTION ENGINE

Pistons for internal combustion engines comprise piston rings to ensure the double object of providing sealing of the combustion chamber between the piston and the cylinder and to prevent the greater part of the oil projected on the walls of the cylinder, from leaking into the combustion chamber.

In the present state of the art these piston rings are generally three or more in number : two of them at the least, called compression piston rings have for object to prevent the passage of the gases from the combustion chambers to the crankcase during the compression, combustion and exhaust periods, and from the crankcase to the combustion chambers during the intake periods. This result is obtained in the present technique, principally by the following means employed together or separately : the limitation, as extensive as possible, of the clearances between the piston rings and the grooves which receive them, the slanted shaping of the piston rings so as to make them bear in their grooves on circles disposed at two ends of a diagonal line of their section, the reduction to the lowest width possible of the section and finally the shaping of the periphery, carefully adapted to the wall of the cylinder.

The oil control piston ring is situated in a groove, below the two preceding ones, generally at the top of the skirt of the piston which slides and rubs in the cylinder. The oil control piston rings are in the main composed of two rims : they are, either carried by a cast iron ring of one piece, or constituted by steel rails applied against the cylinder and the walls of the groove by an expanding spring, or composed of sections of steel rims, nearly joining and interconnected elastically, which together form two circular rims held against the cylinder. The faces of present oil control piston rings are, either mounted with a small clearance, or applied elastically so as nearly to join against the side walls of the groove ; in any case, the space between the two rims is opened and communicates to a great extent with the bottom of the groove, itself in wide communication with the crankcase.

Certain combustion engines and specially Diesel engines have a larger number of piston rings and ensure sealing by means of more than two compression piston rings, and/or the oil control, by means of more than one oil control piston ring.

In order words, the present technique of piston and pistons rings units consists in ensuring, on the one hand sealing between the combustion chambers and the crankcase by a succession of obstacles, constituted by the compression piston rings and the oil control piston ring, mounted in their grooves with as small clearances as possible, each of said obstacles bringing to the sealing the contributions to which are added the load losses which it imposes on the leakage circuit, and on the other hand, the retaining of the oil by the scraping of the cylinder walls, by means of these successive obstacles, the principal mission of stopping the oil devolving on the oil control piston ring or rings.

The disadvantage of these present units is not to fix positively the place, role and inter-reaction of each piston ring with the piston at each moment of the cycle and consequently to have a problematical and inaccurate behaviour while at the same time greater importance than strictly necessary insofar as the number of elements and the space occupied are concerned.

On the other hand, these pistons rings are exposed to the risk of paralysis by clogging in their groove. These are disadvantages which render necessary two compression piston rings or more. Moreover, the variations of the gaseous leaks proceeding from the combustion chambers, called "blow-by," which result therefrom, may give rise to pressure peaks above the oil control piston ring, capable of disturbing its operation to the point, in certain cases, when this pressure exceeds its application pressure against the cylinder, of bringing about its temporary loosening from the wall of the cylinder. These phenomena are the main causes of the variations of oil consumption which is often the case in series engines which, although assembled with elements apparently identical, since they have undergone the same controls, show considerable variations of oil consumption. Finally economy in oil is sought after by the limitation and isolation of quantities of oil as reduced as possible which escape the scraping which implies, through insufficiency or dilapidation of the lubricant assigned to the cylinder heads, the risk of their deterioration.

The new piston-piston rings unit comprises on the contrary the association of the piston with only two piston rings, as a rule : one for compression, the other for retaining oil, these elements being constructed in such a manner that each piston ring acts, no longer as an obstacle to the escape of gases of uncertain and inaccurate behaviour, but as a positive valve associated with the piston in the role of a seat, as well as with the other piston ring, the inter-reaction of all these elements being organized positively by construction.

This result is obtained by employing as a whole or in part the following means : the compression piston ring and its groove are constructed on the one hand to provide access for the pressure of the combustion chamber over the whole or a part of the upper face of the piston ring. When the upper faces of the piston ring and groove are applied one against the other and to prevent access of said pressure on the lower face of the piston ring, when the lower faces of the piston ring and groove are applied one gainst the other; on the other hand by producing through grinding, mechanical perfection or interposed joint, an efficient sealing of the lower faces of the piston ring and groove. Thus, during the power period, the compression piston ring is subject to high pressures, which overcome its inertia and its friction on the cylinder and energetically apply against the groove its face opposite to the combustion chamber by positively closing the gas passage. One may further improve the operation of the compression piston ring by assisting it in its sealing role by means of a joint of flexible material disposed at the bottom of the groove.

The oil control piston ring and its groove are constructed : a) to provide access for the pressure resulting from the residual escape from the compression piston ring over the whole or a part of the upper face of the oil control piston ring; b) by combining the weight of the piston ring, its application pressure against the walls of the cylinder and, either the clearance of the piston ring in its groove, or the application pressure of the faces of an elastic piston ring against its groove as well as their clearance so that, on the one hand, at the time of the most important output of the residual leak from the compression piston ring and of the oil scraped on the cylinder, the discharge of the residual leak and of the scraped oil is effected exclusively by the passage between the contiguous walls of the piston ring and the groove, and never between the piston ring and the cylinder; on the other hand, at the time of the lowest output of the residual leak from the compression piston ring and of the oil scraped on the cylinder, the pressure of the residual leak is at least slightly higher than that of the dynamic pressure of the oil existing in the bottom of the groove of the oil control piston ring; c) by producing by grinding, mechanical perfection or interposed joint, an efficient sealing of the upper faces of the piston ring and groove.

One may further improve the operation of the oil control piston ring by providing access for the dynamic pressure of the scraped oil over the whole or part of its lower face and by disposing the apertures in the bottom of the groove ensuring the return of the oil and the discharge of the blow-by to the crankcase in such a way that the pressure of the dynamic oil at the bottom of the groove be reduced or eliminated during the downward strokes of the piston. Thus, during the power period, the pressure brought about by the residual leak from the compression piston ring and that of the scraped oil are limited, below those which produce the loosening from the cylinder of the rims of the oil control piston ring; these pressures oppose one another on each of its faces and determine, taking into account its inertia and its friction on the cylinder, a position of equilibrium which simultaneously opens two passages towards the crankcase, one for the gases proceeding from the residual leak, the other for the oil scraped on the cylinder.

In these various conditions, the oil control piston ring: a) positively maintains its scraping function during the downward strokes by ensuring up to the maximum conditions of wear of the engine, the role of valve for the discharge of the blow-by and, if need be, the return of the scraped oil to the crankcase, by the fact that it is protected against the risk of losing its contact with the cylinder; b) positively recycles during its upward strokes, the oil which has lubricated the tops of the cylinder, which permits, on the one hand, of lubricating them more freely without for that matter consuming oil, and, on the other hand, of renewing, by recycling and replacement, the lubricant in the tops of the cylinders.

Finally, the very satisfactory sealing obtained with a compression piston ring according to the invention and the positive flow of the oil above the oil control piston ring ensure for the piston head a cleanness unknown with conventional piston ring systems, a lower temperature by the elimination of the blow-by influence and satisfactory lubrication; these three reasons permit of employing the whole of the piston head to prolong the mechanical contact between the piston and the cylinder under working conditions which may be compared with those of the skirt of the piston which, amongst other advantages, improves the cooling of the piston and its mechanical behaviour.

Of course, the fact of resorting to more than two piston rings, by causing each one to operate as a valve with a positive effect, as stated above and explained in the description, would remain a realization in conformity with the invention. It would offer on the one hand, an advantage in safety in case one of the multiplied members would fail, on the other hand, the disadvantage of dividing, during the power period, the differences of pressure employed according to the invention to give valve motions to each piston ring which would reduce for each one the safety of its positive action; finally, the disadvantage of having resort to supplementary members.

Other characteristics and advantages of the present invention will appear in the course of the following description with reference to the accompanying drawings in which :

FIGS. 4, 5 and 6 show each one a partial view in its cylinder, of a piston head representing the enlarged details of an oil control piston ring of the fixed height type and its groove;

FIG. 7 shows a partial view in its cylinder of a piston head representing the enlarged details of an oil control piston with elastic lateral sealing and its groove;

FIG. 7a, 7b and 7c show details of execution of rails and groove;

Figure 1:
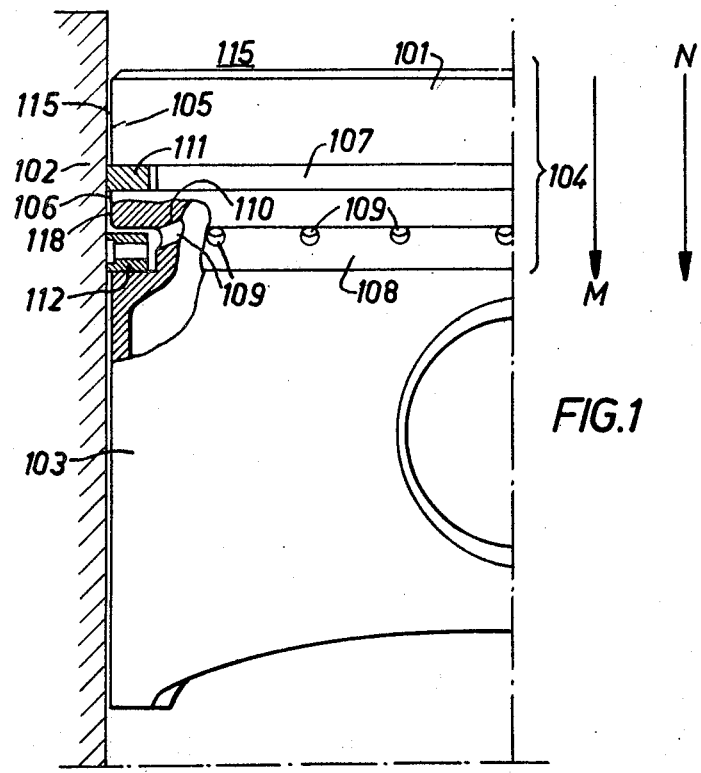
FIG. 1 shows a piston and piston rings unit in its cylinder.

In FIG. 1, a piston 101 of an internal combustion engine is represented in a cylinder 102. It comprises a skirt 103, adjusted as is the custom in the cylinder 102, and a piston ring holding head 104. The outer diameters of the different levels of said head are usually less by nearly 0.010 inch than that of the skirt but according to a characteristic of the present invention, they may be increased to bring the walls 105 and 106 of the head 104, when the engine has reached its operating temperature, into mechanical contact with the cylinder which means constructing the said walls of the head 104 in the extension of the skirt, taking into account the above mentioned thermal correction.

This head has as a rule two grooves, the one 107 for the compression piston ring, the other 108 for the oil control piston ring. The bottom of the groove of the oil control piston ring is, as is the custom, in wide communication with the crankcase by orifices 109 which issue usually at the middle or towards the bottom of the groove 108 but according to a characteristic of the present invention they issue preferably in the groove, at a level with or above its upper face and the upper wall of said orifices is then perpendicular to the axis of the piston or, preferably, directed towards the top of the inner cavity of the piston, as is the case of the wall 110.

A compression piston ring 111 is mounted in the groove 107 and an oil control piston ring 112 is mounted in the groove 108. This piston-piston rings unit is characterized by the following points :

The compression piston ring 111 is a piston ring of known type, preferably covered with a hard friction layer, such as chromium or molybdenum; it is mounted in its groove 107 with the normal clearance of the order of 0.0004 to 0.0020 inch between the side faces; it presents in association with the groove 107 a rectangular or slightly trapezoidal section and the following particularities :

Firstly: the compression piston ring and its groove dispose, when the contiguous upper faces of the piston ring and groove are applied one against the other, of means for reserving the access of the pressure existing in the combustion chamber over the whole or a part of the upper face of the compression ring. This result is obtained for example in a positive manner (FIG. 2) by a slight opening of the upper faces of the compression piston ring 213 and of its groove 214 outwardly of the piston which ensures their contact at a certain distance from the outer edge of the face 213 and in a less sure manner (FIG. 3) by a nearly parallel construction, but not tight, of the upper contiguous faces of the piston ring 313 and groove 314, which is the case of the normal present manufacture of piston ring and groove faces; this second method is indeed less sure, because it does not exclude within the tolerance limits of machining, the establishment of a contact which grinds between the faces 313 and 314 adjacent to their periphery, which would thus not allow the pressure of the combustion chamber 315 to introduce itself between said faces when they are applied one against the other.

secondly: the compression piston ring and its groove dispose, when the lower contiguous faces of the piston ring and groove are applied against the other, of a means for stopping the pressure of the compression chamber, which has access to the bottom of the groove by the construction of the upper faces mentioned under firstly and by the clearance of the piston ring in its groove, to prevent said pressure from introducing itself between the above mentioned contiguous faces. This result is obtained for example in a positive manner (FIG. 2) by a slight opening of the lower faces of the compression piston ring 216 and its groove 217 outwardly of the piston, which ensures their contact at a certain distance from the outer edge of the face 216, the angle $b$ of said opening being sufficiently small for the application of these two faces the one against the other to take place through the flexibility of the piston ring during the power period of the cycle. It is also obtained but in a less sure way, (FIG. 3) by a construction of the contiguous lower faces of the piston ring 316 and its groove 317, exactly parallel and tight, which is not the case with the present manufacture of piston ring and groove faces, which are only, as stated above under firstly, approximately parallel and not tight.

thirdly: the contiguous lower faces of the compression piston ring and groove are adjusted and/or mounted one with the other in such a way that the application of these two faces one against the other produce between them an efficient sealing the criterium of which is, in association with a good circumferential contact of the periphery of the piston ring against the cylinder and a limited clearance section, in conformity with normal use, to limit the volume of the blow-by, to a most equal level, generally much lower and more stable in comparison with the one obtained by good piston ring systems, with multiple compression piston rings, known to this day.

Figure 2:
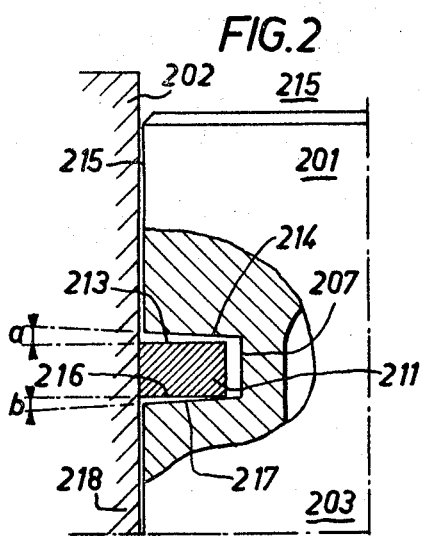
FIGS. 2 and 3 show each one a partial view in its cylinder, of a piston head representing the enlarged details of a compression piston ring and its groove.
Figure 3:
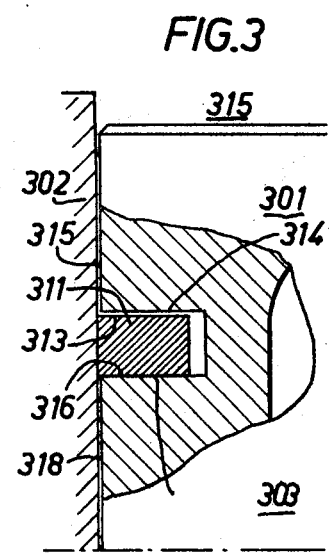

This result is obtained, for example in FIGS. 2 and 3, by the grinding of the lower contiguous faces of the piston ring 216 and 316 and/or the groove 217 and 317, preferably the one with the other, the piston ring being then during grinding, subjected to a constraint identical to the one which it receives from the cylinder or by machining of the above mentioned faces, of very high accuracy, the piston ring being subjected to the same constraint, or again by the interposition between the above mentioned faces of a sealing joint.

The oil control piston ring 112 is also a piston ring of known type; its section is rectangular or slightly trapezoidal and it offers, in association with its groove 108, the following particularities:

Firstly: The oil control piston ring and its groove dispose, when the upper contiguous faces of the piston ring and groove are applied one against the other, of a means for reserving the access of the pressure existing in the clearance between the piston and cylinder above the piston ring over the whole or part of the upper face of the oil control piston ring. This result is obtained for example in a positive manner (FIG. 4) by a slight opening $c$ of the upper faces of the oil control piston ring 416 and its groove 417 outwardly of the piston, which ensures their contact at a certain distance from the outer edge of the face 416 and in a less sure way (FIG. 5) by a construction of the upper contiguous faces of the piston ring 516 and the groove 517 approximately parallel, but not tight, as is the case in the normal present manufacture of piston ring and groove faces; this second method is in fact less sure, because it does not exclude, within the tolerance limits of machining, the establishment of a contact which grinds between the faces 516 and 517, adjacent their periphery, which would not allow the pressure existing in the clearance 518 between the piston and the cylinder to introduce itself between them when they are applied one against the other.

Secondly: The oil control piston ring and its groove dispose, when the lower contiguous faces of the piston ring and groove are applied one against the other, of a means for reserving the access of the oil pressure existing in the clearance between piston and cylinder, below the piston ring over the whole or a part of the lower face of the oil control piston ring.

This result is obtained for example in a positive manner (FIG. 4) by a slight opending $d$ of the lower faces of the oil control piston ring 419 and its groove 420 outwardly of the piston, which ensures their contact at a certain distance from the outer edge of the face 419 and in a less sure way (FIG. 5) by a construction of lower contiguous faces of the piston ring 519 and groove 520 approximately parallel but not tight, as is the case in the normal manufacture of the faces of piston rings and grooves; this second method is indeed less sure, because it does not exclude, within the tolerance limits of machining, the establishment of a contact which grinds between the faces 519 and 520 adjacent to their periphery, which would not allow the dynamic pressure of the oil existing in the clearance 521 between the piston and cylinder, to introduce itself between them, when they are applied one against the other.

The interruptions of continuity of the lower face of the groove of the oil control piston ring which are usual on modern pistons due to the presence of orifices for the flow of oil or for the thermal isolation slots, must be eliminated.

Finally, although this condition as above mentioned is favourable in a unit produced in accordance with the invention, it is useless when the piston is provided with a known device for discharging to the crankcase the oil scraped on the cylinder during the down-ward strokes by the lower rim of its oil control piston ring, such as groove or collecting chamfer and orifices through the skirt of the piston.

Thirdly: The upper contiguous face of the oil control piston ring and groove are adjusted and/or mounted one with the other in such a way that the application of these two faces one against the other produces between them an efficient sealing the criterium of which is, in association with a good circumferential contact of the periphery of the piston ring with the cylinder and a limited clearance section, as is usual, to realize, without the usual assistance of multiple compression piston rings, a control of the rising of the oil towards the top of the cylinder at least equal generally better and more regular than that obtained by good segmentations with multiple compression piston units, known at this date.

This result is obtained, for example in FIGS. 4 and 5, by honing the upper contiguous faces of the piston rings 416 and 516 and/or grooves 417 and 517, perferably the one with the other, the piston ring being then during honing, subjected to a constraint identical to the one which it receives from the cylinder, or by machining the above mentioned faces with very great accuracy, the piston ring being subjected to the same constraint or again by the interposition between said faces of a sealing joint.

Fourthly: The oil control piston ring is mounted in its groove with a clearance determined by the following criteria: if the piston disposes of other means than the space between the lower contiguous faces of the oil control piston ring and groove to bring to the crankcase the oil scraped by the oil control piston ring, the clearance of the piston ring in its groove should:

a. be sufficient to discharge to the crankcase the most important output of the residual leak of the compression piston ring without, at the moment of the peak of said output, the gaseous pressure of said residual leak in the circular space between the piston and the cylinder above the oil control piston ring reaching, or running the risk of reaching in the most unsatisfactory conditions, the unitary bearing pressure of the rims of the piston ring on the walls of the cylinder;

b. be however limited so that at the running conditions giving the lowest volume of blow-by, the pressure of the blow-by above the piston ring be at any moment clearly higher than the dynamic pressure of the oil situated in the bottom of the groove of the oil control piston ring so as to avoid, when the peak pressure of the blow-by opens the passage between the above mentioned upper faces, the pressure of the oil in the bottom of the groove maintaining the passage open, in particular during the power period and thus allowing the oil at the bottom of the groove to deposit itself on the cylinder, above the oil control piston ring.

If the return to the crankcase of the oil scraped on the cylinder is ensured by the clearance between the lower contiguous faces of the piston ring and groove, the criteria a) and b), mentioned above, must take into account the portion of clearance which is necessary for the passage of the oil, which will add itself to the clearance defined above.

These results are obtained for example FIGS. 4 and 5, by the clearances 422 and 522 of the oil control piston rings in their grooves, which are adjusted as well as the application pressure of the oil control piston rings 412 and 512 on the cylinder to fulfil the above conditions.

The particularities defined above, firstly to fourthly, are described for an oil control piston ring of fixed height, for example of the cast iron type shown in FIGS. 4 and 5 or of the cut out, apertured and folded steel type shown in FIG. 6.

In this embodiment, one sees in a piston 601 between its skirt 603 and its head 604, its groove 608 containing an oil control piston ring 612 of the cut out, apertured and folded steel type. With these piston rings, taking into account that their faces 616 and 619 only offer a continuous surface on a part of their radial width limited by the edges 623 and 624 of the central openings 625, a satisfactory way of fulfilling the conditions firstly and secondly consists in constructing each groove face by means of a central part 626–627 for the upper face and 628–629 for the lower face which is parallel to its piston ring contiguous face, then to provide the access of the prescribed pressures on the faces of the piston rings, by means of openings of groove faces $e$ and $f$, directed outwardly of the piston. The third condition in this case is ensured by grinding of the piston ring, under its operational constraint, and of its groove contact, or by high precision machining of the parallel upper contiguous faces of the piston ring and groove, or again by the interposition between the above mentioned faces of a sealing joint; the radial width of this contact is at least equal to the total of the minimum overlapping width necessary for sealing, about 0.01 inch, and of the maximum radial wear of the cylinder 602 and piston ring 612. Finally, the fourth condition is ensured by the clearance 622 between the piston ring 612 and the parallel walls 626–627 and 628–629 of the bottom of the groove 608.

One may further apply the first and fourth particularites defined above to a known oil control piston ring, so called three piece piston ring, shown in FIG. 7. This type of piston ring consists of two rails 730 and 731 applied by means of a central expander 732, on the one hand by their outer rims against the cylinder, on the other hand by the central edge of their outer faces against the faces of its groove.

This type of piston ring, in its position of rest, fulfills the above first and second conditions, by means of the angular openings g and h between the adjacent faces of its rails and of its groove 716 and 717 on the one hand, 719 and 720 on the other hand, but in operation, when friction and inertia act thereon, the rails 730 and 731 may apply against the adjacent walls 717 and 720 and thus risk not fulfilling these two conditions. A means according to the invention for re-establishing the first and second conditions consists in disposing (FIGS. 7a and 7b) on each outer face of the rail 716 and 719 adajcent to its periphery, a very light circular knurling 733, for example of a depth of about 0.0008 inch. Another means consists in effecting a circular knurling of similar importance 734 and 735 (FIG. 7c) on the outer edge of the groove faces. Yet a further means consists in machining the peripheries of the rail faces and/or of the groove at the positions 733, 734 and 735 with a finishing insufficient to be tight at the low pressures in question.

The third condition is obtained with this type of piston ring as with the preceding ones, by grinding of the piston ring under its operational constraint and of its groove contact or by high precision machining of the upper contiguous faces of the piston ring and of the groove or again by the interposition between the above mentioned faces of a sealing joint.

The fourth condition is ensured by the combination of the elastic application of the central parts of the outer faces 716 and 719 of the rails against the groove faces 717 and 720 with the clearances 736 and 737 which permit each rail to approach its expander under the effect of the pressures acting on its outer face by disengaging to the maximum the same clearances between them and their contiguous groove faces.

Figure 8:
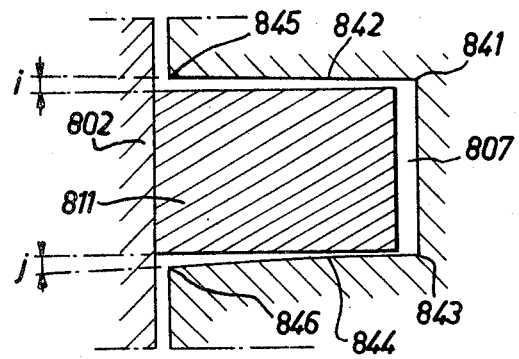
FIG. 8 shows a partial view in its cylinder, of a piston head representing the greatly enlarged details of a compression piston ring and its groove.

FIG. 8 shows a form of the embodiment of the angle opened outwardly of the contiguous faces of a compression piston ring and its groove, in which the contiguous groove and piston ring faces are parallel over a portion 841–842 and 843–844 of the depth of the groove, as from the bottom of the groove - then over the portion 842–845 and 844–846, they have a slight opening i and j similar to those of the preceding figures.

This arrangment, identical to the one already shown in FIG. 6 for an oil control piston ring, may be applied both for compression piston rings and for oil control piston rings to a single or to the two contiguous piston ring and groove faces.

In addition to the particularities detailed above which characterize the piston and the piston rings units according to the invention, there exist a large number of arrangements which specify the particularities already explained or complete them, while remaining bound to the basic idea and to the operation of these new units.

Thus, here are a few complementary explanations in connection with FIGS. 1 to 8, previously cited:

The groove admission chamfers which have a considerable angle, for example 45°, with the planes perpendicular to the axis of the piston, must not be confused with the smal openings a, b, c, d, e, f shown in FIGS. 2, 4 and 6 the angle of which is very small, for example a fraction of a degree, as will be explained further on. Without there being any counter-indication of principle from the point of view of the present invention as to the use of the chamfers on the groove admissions of compression piston rings and although these are generally employed in the present art, it has not appeared useful to show any. On the other hand, it is preferable to dispose on the groove admissions of the oil control piston rings, a chamfer, a rounded part or any other form of disengagement of the angle favourable to the flow of fluid. It is these chamfers which are shown at 438 and 439 (FIG. 4) –638 and 639, (FIG. 6)– 738 and 739 (FIG. 7 and 7c) and these rounded parts at 538–539 (FIG. 5).

The orifices 109 in the bottom of the groove (FIG. 1) reconduct the blow-by and the oil scraped in the crankcase already described are again to be found at 509, (FIG. 5) – 609 (FIG. 6) and 709 (FIG. 7). The orifice 609 (FIG. 6) merits a particular explanation: it is, as already described for the orifice 109 (FIG. 1) the production of these orifices, often employed on modern pistons, constituted by two long slots which issue in the groove of the oil control piston ring, generally at a certain distance from each face.

According to the invention, the upper wall 610 of this slot 609 is joined to the groove 608 at the leel of or above its upper face 626–627 and is directed, from its junction 626 with the upper groove face, up to its junction 686 with the wall of the central cavity of the piston towards the top of said central cavity of the piston. The dotted lines show the groove bottom wall in the sectors not intersected by these slot-shaped orifice 609. Further, according to the invention, the inner wall of the piston 640 connecting the inner wall of the skirt to the lower open face of the groove, at 628, is inclined and directed towards the top of the central cavity of the piston.

FIG. 7 further shows an embodiment of the orifices 709 when the latter are holes terminating at the bottom of the groove; according to the invention, the intersection 741 of the hole 709 with the central cavity of the piston is inclined in such a way that its high point is nearer to the axis of the piston than its low point.

Figure 9:
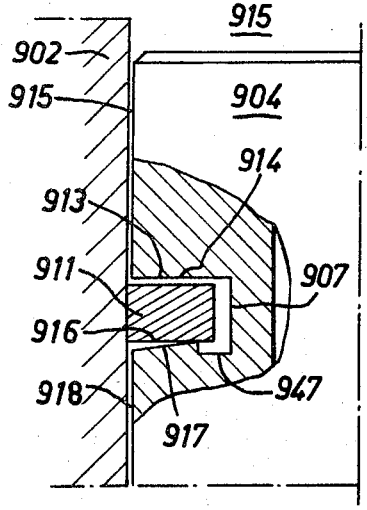
FIGS. 9 to 12 show each one a partial view in its cylinder, of a piston head representing the enlarged details of a compression piston ring or an oil control piston ring as well as their grooves, which comprise various arrangements of the invention.
Figure 10:
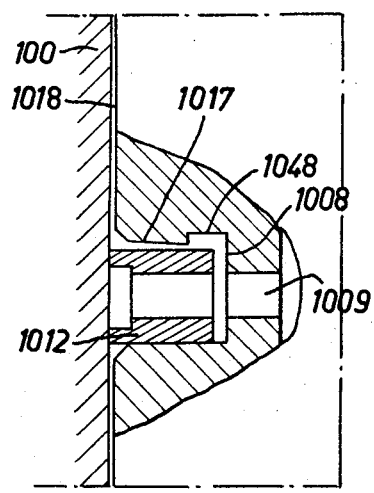

FIGS. 9 and 10 show respectively in the groove of the compression piston ring, then in the groove of the oil control piston ring, a recess 947 and 1048 in the face of each groove the sealing of which with the face of the piston ring is obtained when they are applied one against the other.

Figure 11:
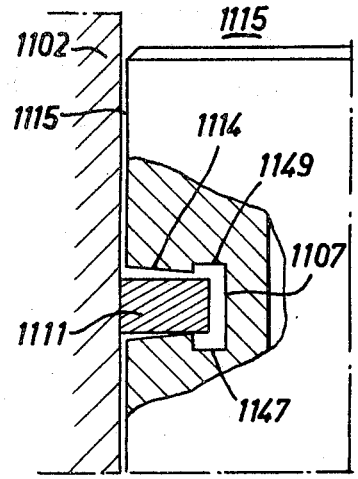
Figure 12:
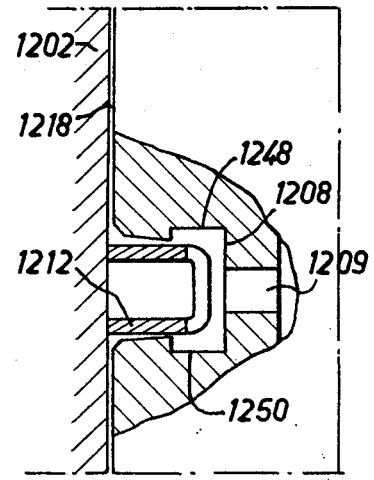

FIGS. 11 and 12 show respectively in the groove of the compression piston ring and then in the groove of the oil control piston ring in addition to the preceding recesses 947 and 1048, a recess 1149 and 1250 in the face of each groove the sealing of which with the face of the piston ring when they are applied one against the other, does not permit any particular requirement.

Figure 13:
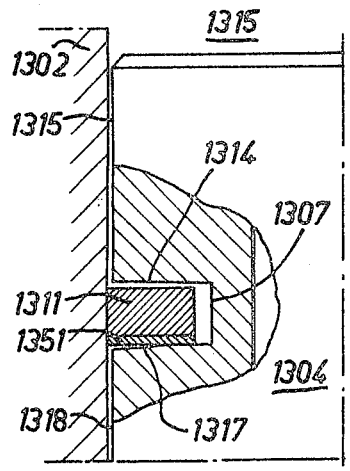
FIGS. 13 and 14 show each one a partial view in its cylinder, of a piston head representing the enlarged details of a compression ring and its groove or of an oil control piston and its groove, each unit having in addition a lateral sealing joint.
Figure 14:
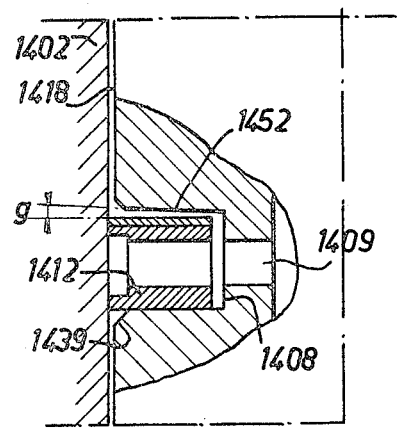

FIGS. 13 and 14 show respectively a compression piston ring and its groove then an oil control piston ring and its groove, each unit being associated with a joint 1351 and 1452 to improve the sealing between their respective lower and upper faces and the contiguous faces of their grooves. These joints associated with the piston rings and the grooves may be employed together, that is to say for the two piston rings or separately, that is to say for one or the other of the piston rings. They may be applied, for the compression piston ring and the oil control piston ring, with the various types of piston rings and grooves previously described. They could also be utilized on the upper face of the compression piston ring and on the lower face of the oil control piston ring but this would present less interest, because the sealing of these faces is of little importance. Amongst the materials capable of ensuring this use, are the metals such as copper and certain of its alloys and in the range of plastics the "Teflon" with or without a supplementary filler, of which the characteristics of resistance to wear, compression and extrusion, to heat, oils and fuels are satisfactory and known. It would be advantageous, in particular for the compression piston ring, to give this joint an outer diameter under heat slightly greater than the diameter of the cylinder, in order to obtain a continuous circumferential contact. This disposition will permit of reducing the leakage output from the clearance of the cut of the piston ring and of assisting the piston ring with a view to the sealing of its circumferential contact.

According to a disposition of the invention these joints are cut out as a piston ring and then put into place by opening the cut. According to another disposition, they are put into place as a whole by elastic or semipermanent deformation, on an admission cone for example, the reheating to the temperature of the pistons, in the neighbourhood of 390°F. contributing in the case of the "Teflon" to give them back their original shape and dimensions.

Figure 15:
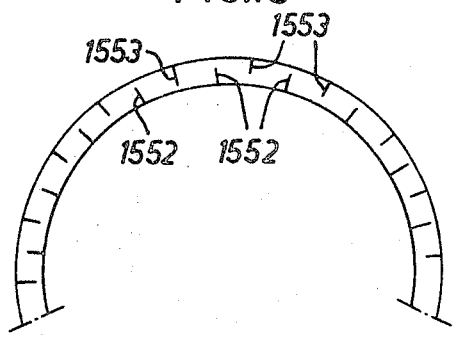
FIGS. 15 and 16 show two forms of embodiment of the lateral joints represented in FIGS. 13 and 14.
Figure 16:
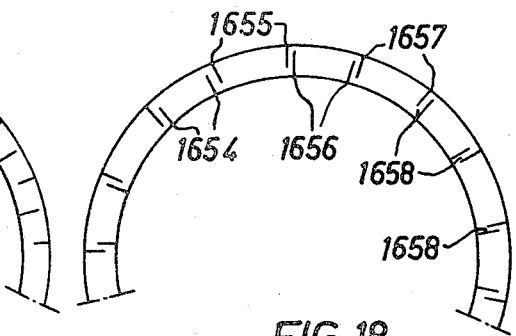

According to another disposition of the invention shown in FIGS. 15 and 16, these joints have no cut, but comprise slots which are open on one of the inner or outer edges and are closed on the other. The slots opened outwardly or inwardly are alternate; those shown in FIG. 15 at 1552 and 1553 are preferably disposed regularly around the whole periphery of the joint; those shown in FIG. 16 are also disposed over the whole periphery of the joint, but they alternate two by two 1654/1654 – 1655/1655 – 1656/1656 – 1657/1657 and the slots opened in the same direction are spaced apart whereas those opened in the opposite direction are close to one another, which creates between them deformable strips 1658.

In the main, the thickness of these joints is small; if they are in "Teflon," their material could contain incorporated products, called supplementary fillers, such as glass, bronze, glass and graphite, glass and molybdenum bisulphide, which increase their mechanical characteristics and their thermal conductibility. Satisfactory results have been obtained with "Teflon" joints filled with bronze, of a thickness of 0.01 to 0.02.

Figure 17:
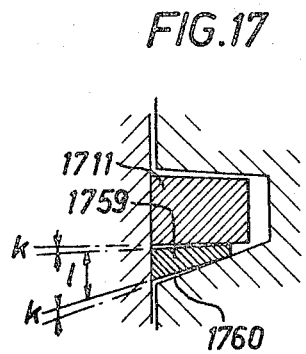
FIGS. 17, 18, 19 and 20 show each one a partial view in its cylinder, of a piston head representing the enlarged details of a compression piston ring and its groove or of an oil control piston ring and its groove, each unit having in addition a lateral sealing joint.

FIG. 17 shows a compression piston ring 1711 and its groove associated with a joint of plastic material 1759 which has the particularity of having an outer diameter approximating or slightly greater than that of the cylinder and a trapezoidal section, cooperating with the lower face of the groove 1760. When the piston ring is applied without effort on the lower face 1760 of its groove, the contiguous faces of the ring and of the joint and those of the joint and of the groove are either parallel, touching and tight or slightly open towards the exterior, within the limits of the elastic deformations to which the ring is subjected under the high pressures of explosion and combustion. The angles $k$ show this slight opening. The angle $l$ of the slope of the joint 1759 is fairly wide, for example 15°, to obtain, under the pressures of explosion and combustion, a radial effect which applies the joint 1759 against the cylinder.

Figure 18:
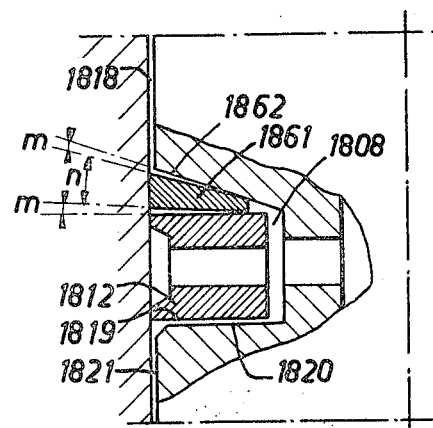

FIG. 18 shows an oil control piston ring 1812 and its groove 1808 associated with a joint of plastic material 1861 similar to the joint of the preceding figure; its outer diameter approximates or is slightly greater than the inner diameter of the cylinder and there is a trapezoidal section which cooperates with the upper face of the groove 1862.

When the piston ring is applied without effort against the upper face 1862 of its groove, the contiguous faces of the ring and the joint and those of the joint and the groove are either parallel, touching and tight or slightly open towards the exterior; the angles $m$ show this slight opening. The angel $n$ of the slope of the joint 1861 is fairly wide, for example 15°, to obtain, when the ring is applied against the upper face of the groove, a radial effect which applies the joint 1861 against the cylinder.

Figure 19:
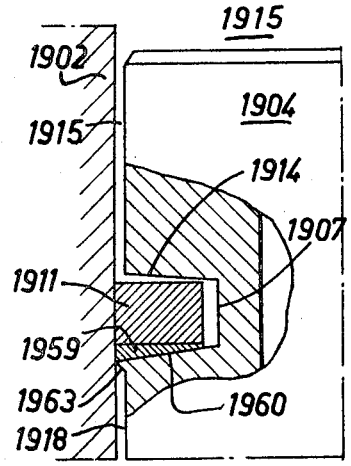

FIG. 19 shows another characteristic of the invention applicable to pistons the ring holding head 104 of which, (FIG. 1) is, as is usual, withdrawn by about 0.010 inch, relative to the diameter of the cylinder; in this case, in order to use a joint such as shown in FIGS. 13 or 17, an outer extension 1963 (FIG. 19) of the lower face of the groove 1960 up to a diameter approximating that of the cylinder ensures a support for the joint 1959 or 1351 of FIG. 13.

Figure 20:
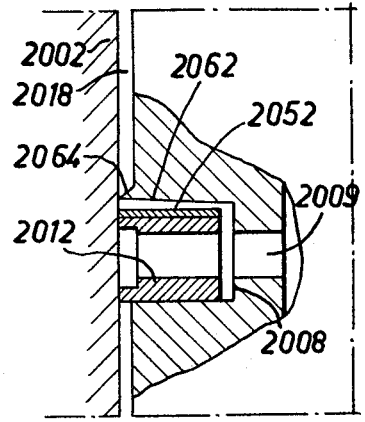

FIG. 20 shows a similar support 2064, applicable under identical conditions to an oil control piston ring unit 2012 and groove 2008, which prolongs the upper face of the groove 2062 of the oil control piston ring up to the neighbourhood of the cylinder.

Figure 21:
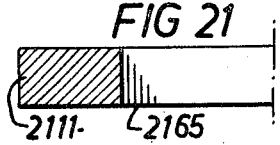
FIGS. 21 and 21a show a partial view of a compression piston ring carrying a plastic coating adhering to one of its faces and to the ends of its section.
Figure 21A:
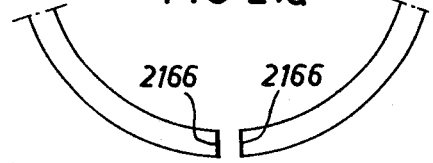

FIGS. 21 and 21a show a compression piston ring 2111 on which a layer of a plastic product, for example "Teflon," has been applied by any method at present known, on its lower face 2165 and/or on the faces of the cut 2166.

FIGS. 22, 23, 24 and 25 each show an annular elastic joint of known type, disposed at the bottom of the groove of the compression piston ring between the bottom of the groove and the piston ring, providing the usual tightening between the inner face of the piston ring and the bottom of the groove.

Figure 22:
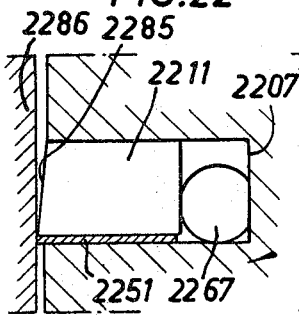
FIGS. 22 to 26 and 26a and 26b show each one a partial view in its cylinder, of a piston head representing the enlarged details of a compression piston ring and its groove with or without a side joint, but having a sealing joint at the bottom of the groove.

The joint 2267 of FIG. 22 is a toric joint, that is to say that its free section is a circle. The compression piston ring 2211 is conical and includes a face joint 2251 in conformity with the invention.

Figure 23:
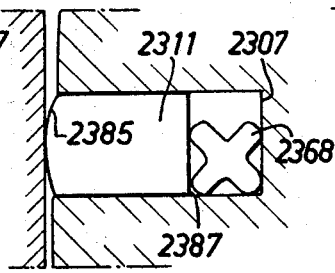

The joint 2368 of FIG. 23 has a free section having four joining flaps.

Figure 24:
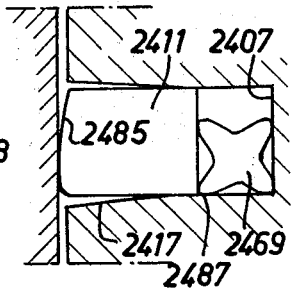

The joint 2469 of FIG. 24 has a free section having four joining flaps.

The joint 2469 of FIG. 24 has a free section having four sharp rims added to the outer rounds of the four lobes of the joints 2368.

Figure 25:
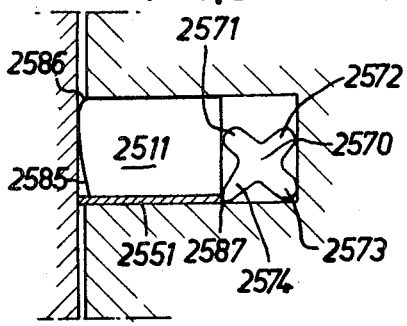

The joint 2570 of FIG. 25 has a section having three lobes 2571, 2572, 2573 and a sealing rim 2574 combined together. The contact of the rim 2574 is obtained against the lower part of the inner cylindrical face of the piston ring and is directed so as to lock any motion of fluid through the bottom of the groove, from the lower face towards the upper face.

Figure 26:
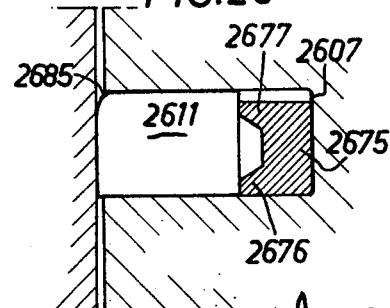

FIG. 26 shows an elastic annular joint 2675, placed, as the preceeding joints, at the bottom of the groove 2607 of the compression piston ring 2611, between the bottom of the groove and the piston ring. Its section offers a body element having a sealing contact with the bottom of the groove. This body element has a rectangular shape in the embodiment shown but it could have any other shape; it carries, on its face contiguous to the piston ring, one or more edges 2676, 2677 which have a resilient contact against the piston ring. The section of each of these edges 2676 and 2677 may have a trapezoidal shape (FIG. 26) or any geometrical shape, or a rim provided with a sharp and flexible edge directed so as to stop one or the other of the two directions of flow of fluid in the bottom of the groove, or a combination of these dispositions, in particular two similar rims but in opposite direction with a view to locking within the bottom of the groove, the motions of fluid in the two directions.

Figure 26A:
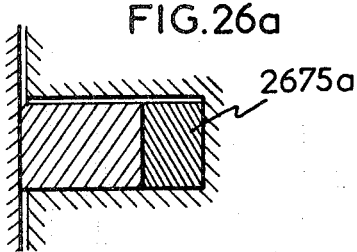
Figure 26B:
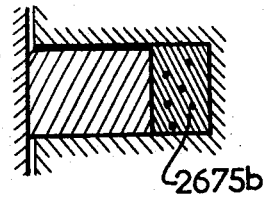

FIG. 26a shows an elastic annular joint 2675a which fills almost all the volume of the bottom of the groove, to the exception of the very small space provided for the dilations of the matter forming the joint which can be obtained by providing a very small clearance in the groove or incorporating gaseous bubbles in the matter of the joint (case of the embodiment of FIG. 26b).

These various elastic joints shown in FIGS. 22, 23, 24, 25 and 26 may have any other known section shapes, for example square or rectangular. They are moulded, drawn or cut out into a product chosen in the range of elastomers to resist, while preserving satisfactory dimension and elasticity characteristics, the temperatures at the bottom of the piston groove and the chemical aggressions of hydrocarbons and combustion products. Satisfactory results have been obtained with the synthetic rubber "VITON" manufactured by Du Pont de Nemours, of Shore 70 hardness.

The outer face of the compression piston ring presented with these various joints preferably assumes any shape capable of allowing the subsist against the wear of the piston ring an incline, angle or rounded shape at the junction of its outer wall with the periphery of its upper face. In this spirit, the piston ring 2211 of FIG. 22 hase a cone 2285, the piston ring 2311 of FIG. 23 a symmetrical curbed profile 2385, the piston ring 2411 of FIG. 24 a curved profile contacting downwardly 2485, the piston ring 2511 of FIG. 25 a curved profile contacting upwardly 2585 and the piston ring 2611 a cylindrical profile connected by a rounded part 2685 to its upper face. If the cones and curved profiles are not sufficiently accentuated so that there subsists against maximum wear of the piston ring a part of the incidence of their profile between the wear surface and the upper surface of the ring, it would be advantageous to add thereto a rounded part such as 2685 (FIG. 26)

Figure 27:
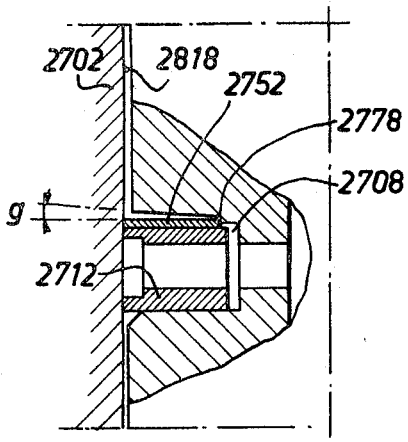
FIG. 27 shows a partial view in its cylinder, of a piston head representing the enlarged details of an oil control piston ring and its groove having in addition a lateral sealing joint slightly embedded in the face of the groove.

The joint shown in FIG. 27 is identical to the one of FIG. 14 but it is characterized by the fact that it is held, in its movement towards the centre of the groove, by a slight recess 2778.

Figure 28:
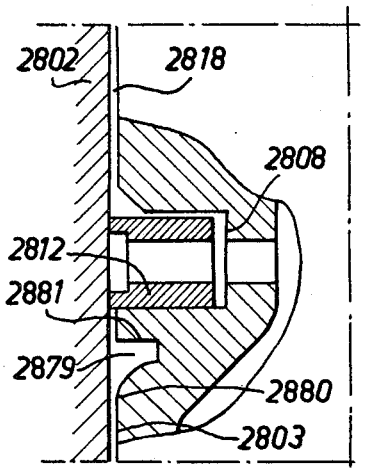
FIG. 28 shows a partial view in its cylinder, of a piston head representing the enlarged details of an oil control piston ring and its groove, having in addition a groove for pre-scraping and retaining the oil.

FIG. 28 shows a groove 2879 adapted to be disposed under a piston ring groove. In this case, it is made in the skirt 2803 of a piston according to the invention, near the groove 2808 of the oil control piston ring 2812; this groove is characterized by a connection 2880 with the skirt, directed towards the lower part of the piston, which is progressive and without any sharp angle and by a connection 2881 with the skirt, situated near the groove of the piston ring which has a sharp angle. For example, a satisfactory result may be obtained with 7° for the angle of the groove at the point of the connection 2880 and 90° for the connection angle 2881.

Figure 29:
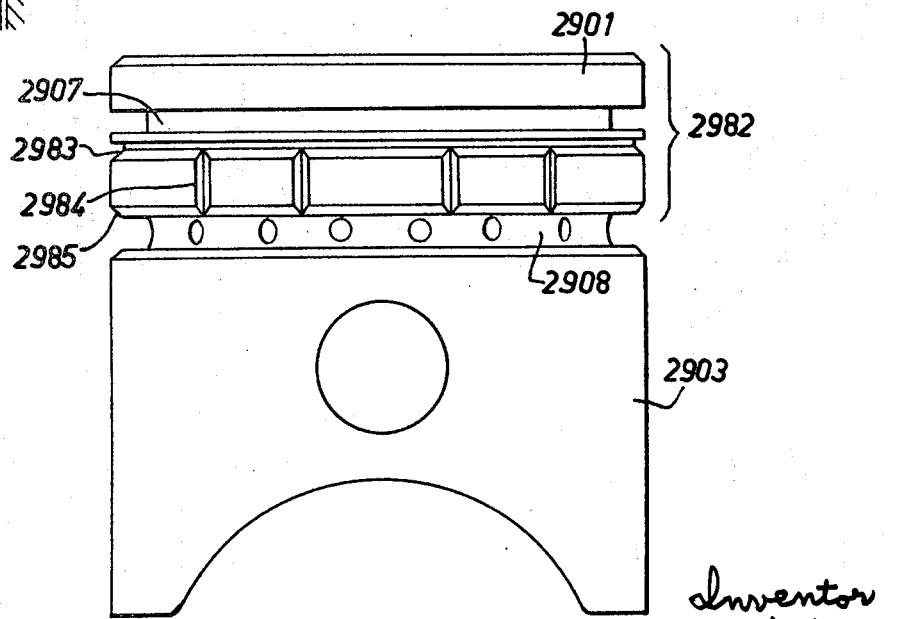
FIG. 29 shows a piston according to the invention provided with a pre-scraping and oil retaining groove placed under the compression piston ring, also fulfilling the mission of collector of blow-by, in combination with longitudinal conduits for the blow-by and a collecting chamfer disposed above the oil control piston ring.

FIG. 29 shows a piston 2901 similar to the one of FIG. 1 but in which, as a function of the degree of sealing of the compression piston ring, as will be explained further on, the extension of the skirt 2903 on the head holding piston ring 2982 may remain free or, on the contrary, carry on the one hand at 2983 a groove, for example of the type of the one shown in FIG. 28, on the other hand a certain number of grooves preferably longitudinal 2984 causing the groove 2983 to communicate with the hollow space provided by the chamfer 2985 at the entrance to the groove 2908 of the oil control piston ring.

In order to explain the operation of this new unit, it should be first of all considered during the power period of a four-stroke cycle, because it is the one which subjects the piston rings to the most complicated biasses and brings about the most considerable disorders in regard to sealing and oil consumption faults.

The piston moves in the direction of the arrow M of FIG. 1. During this movement, the compression piston ring, for example the ring 211 (FIG. 2) is subjected to the inertia and friction against the cylinder which together tend to force it against the upper face 214 of its groove 207, but the explosion or combustion pressure, existing at the high dead point in the combustion chamber 215, subjects it to a very high opposite force which, according to the invention, acts on its upper face 213 which is imposed thereon by the construction, according to the first particularity of the description, whereas its lower face 216 remains, also as a result of the construction, protected against the pressure which acts on its upper face 213, according to the second particularity of the description.

Thus due to its construction, the compression piston ring works like a valve with efficient sealing properties (third particularity of the description) which closes the passage of the gasses upon explosion or combustion and only allows to pass, during the whole power stroke of the piston, the leaks of the contacts of its periphery on the cylinder, of its cut and the residual leaks, greatly reduced by the construction, of the contact of its lower face on the lower face of its groove. This valve role played by the piston ring ensures positive control of the leaks which are thus limited to the lowest output which can be reached as a function of the qualities of the surfaces in question. In a conventional unit on the contrary, the behaviour of the piston ring is uncertain, it may hesitate or float between its high and low contacts and the volume variations of the leaks reflect this instability. This application force of the compression piston ring against the wall of its groove opposite to the combustion chamber obtained according to this invention, is all the higher as the difference in pressure is greater between the bottom and the top of the piston ring acting as valve; consequently, there exists a drawback in multiplying the compression piston rings because this results in dividing the beneficial effect of the pressure which must overcome the inertia and friction in order to ensure the sealing of each.

Blow-measurements, effected on controlled ignition engines, provided with satisfactory conventional piston rings comprising two compression piston rings and then equipped with piston ring and piston units including a single compression piston unit per piston, produced in accordance with the dispositions of the invention, have, all conditions being moreover equal, shown a volume of blow-by smaller with the units having a single piston ring per piston, in conformity with the invention, than with the satisfactory conventional piston ring system.

During the same power period, the oil control piston ring, for example the ring 412 of FIG. 4, is subjected to the action of the inertia and its friction against the cylinder 402 which are associated and tend to force it against the upper wall of its groove.

If the sealing of the compression piston ring were total the oil control piston ring 412 would remain applied against the upper wall of its groove, position in which it fulfils its main mission since the oil deposited on the cylinder is scraped by its two rims and then reconducted to the crankcase through the clearance 422 opened under the piston ring, the bottom of the groove 408 and the orifices 409. The oil does not rise towards the clearance between the piston and cylinder 418 due to the tight contact between the upper faces of the piston ring 416 and of the groove 417, applied one against the other; on the contrary, during such a stroke, the small layer of oil remaining at the end of the upward stroke accumulated against the upper rim of the oil control piston ring would not be recycled.

Actually, the sealing of the compression piston ring is not total. Its leaks bring about an over-pressure in the clearance between the piston and cylinder 418 which acts on the upper face 416 of the piston ring 412, due to the fact that the access of said pressure on said face is ensured by the construction (first particularity of the description). When this pressure is suffient to overcome the friction and inertia which force the piston ring against the upper face of its groove, it pushes it back towards the lower face by disengaging the whole or a part of the clearance 422, in such a way that the blow-by is discharged to the crankcase by recycling the above mentioned small oil layer through the circuit 418-422-409; the application or the bringing together of the oil control piston ring against its lower face then brings about at 421 the rise of oil pressure which acts on this lower face during each downward stroke of the piston (second particularity of the description) and ensures at any moment of the power periods a position of equilibrium of the oil control piston ring, to which reference will be made later on. If the piston is provided with a known means for discharging to the crankcase the oil scraped on the cylinder during the downward strokes, this action of the oil pressure under the oil control piston ring is eliminated.

Here is now the operation of the piston-piston rings unit object of the invention during the intake period which is, after the power period, the second one to set problems for the piston ring system, in particular for controlled ignition engines, due to the risks of the mounting of oil under the effect of the high depression which exists in the combustion chambers, especially with average or small loads.

During the first part of this period, the piston starting from the high dead point in the direction of the arrow M, the compression piston ring and the oil control piston ring are positively applied against the upper face of their groove by the effect of the associated inertia, friction and depression, to which may be added, for the oil control piston ring, the pressure of the oil scraped in its lower face. In these positions, the compression piston ring 211 (FIG. 2) closes, without particular sealing, the communication between the combustion chamber 215 and the clearance 218 between piston and cylinder under the compression piston ring; the oil control piston ring 412, (FIG. 4) on the one hand, opens the return of the oil to the crankcase through the clearance which is then opened under its lower face, on the other hand, stops the rise of the oil brought about by the residual depression existing at 418, at the contacts of its upper face with the upper face of its high sealing groove by virtue of its construction, (third particularity of the description) and of its upper rim with the cylinder.

During the last part of the stroke, the inertia tends to loosen the piston ring from the contact with the upper wall and it is then upon the associated effects of friction, depression on its upper face and oil pressure on its lower face that rests the maintenance of the piston ring against the upper face of its groove.

Several of the particularities of the description then have a positive combined action = a) efficient sealing is only required between the lower contiguous faces of the compression piston ring and of its groove, first particularity of the compression piston ring and of its groove; b) the oil control piston ring receives by virtue of its construction the maximum effect of this depression on its upper face, first particularity of the oil control piston ring and of its groove; c) the oil control piston ring receives by virtue of its construction the maximum effect of the pressure of oil under its lower face, second particularity of the oil control piston ring and of its groove. Thus, a piston-piston rings unit according to the invention combines the most favourable conditions to maintain joined the contiguous upper faces of the oil control piston ring and of its groove, as close as possible to the low dead point, at the end of the intakestroke and in addition, this positive maintenace is of high efficiency, due to the third particularity of the oil control piston ring and of its groove.

During the periods of compression and exhaust, the piston moves from the high dead point in the direction of the arrow N. The compression piston ring 211, (FIG. 2) and the oil control piston ring 412 (FIG. 4) are, during the first part of their stroke, applied on their lower faces, by the combined effects of the gaseous pressure, friction and inertia. Then the compression piston ring 211 closes the combustion chamber and only allows the passage of a small residual leak, the oil control piston ring 412 discharges to the crankcase via the passage 418-422-409 the residual oil scraped by its upper rim on the cylinder as well as the residual leak. During the last part of the piston stroke, the force of inertia has been reversed but the position of the piston rings is then of little importance, both from the point of view of the gaseous leak and of the oil consumption, the outputs of the one and of the other being then not very high.

The compression piston ring and its groove (FIG. 3) operate in the same way as the one already described for FIG. 2, taking into account the fact that they offer, by virtue of their construction, while having parallel contiguous faces, the first, second and third particularities described for the compression rings and grooves according to the invention Such is also the case for the oil control piston ring and its groove of FIG. 5, which, although having parallel contiguous faces, have the first to fourth particularities of the oil control piston rings and of their grooves according to the invention, which gives them the same operation as the one already described with regard to the oil control piston ring of FIG. 4.

The oil control piston ring and its groove of FIG. 6, operate also in the same manner, but it is to be noted that this method of construction of the contiguous faces of the piston ring and groove, which one finds in FIG. 8 for a compression piston ring and its groove has adjusting means, by radial displacement of the circular intersections 627 and 629, which constitute parameters for regulating the piston rings. Moreover, the resort to parallel contiguous faces for the piston ring and the groove at the point where their clearances are measured offers a simplification in manufacture and control.

The piston ring with two rails and its groove as shown in FIGS. 7, 7a, 7b and 7c operates like the piston rings and grooves of FIGS. 4, 5 and 6, since they offer the required first to fourth particularities. The knurling of rails 733 or grooves 734–735, or simply the imperfections of the faces ensure the required permanence of the action of the pressures existing at 718 on their upper face and at 721 on their lower face. The combination of the lateral pressure of the rails against their grooves with the clearance of which they dispose to approach the expander determines working conditions, for the pressures necessary for the opening of the passages between contiguous faces, with a higher tendency at low outputs than for the piston rings of the preceding figures.

The operation of the compression piston ring and its groove of FIG. 8, is similar to those of figures 2 and 3, and this realization has the same particular advantages as those already noted above for the oil control piston ring and its groove of FIG. 6. It presents moreover the particular advantage for the compression piston ring of avoiding or of reducing the marking of the groove by the inner angle of the piston ring. Under the low application efforts against its groove, the compression piston ring 811 is in contact with the part 843–844 of the face of its groove which is parallel to its own face and, towards the high dead point of the power period, at the moment of ignition the high pressure deforms the compression piston ring, and applies it on the inclined part 844–846 of the lower face of the groove as has been already explained: the inner angle of the face of the piston ring is thus released from the contact with said face at the moment of the considerable efforts of the piston ring on its groove face and the marking of the groove by said angle is thus eliminated or attenuated.

The various piston ring grooves shown in FIGS. 2, 4, 6 and 8, the operation of which has just been explained, comprise small openings in contiguous faces of piston rings and grooves.

Since these openings only have four purpose to ensure the access of the pressures between them and their piston ring contiguous faces under very small outputs or no output, it is sufficient that they be very small. For example, satisfactory results have been obtained with openings having an angle of 10 to 15 minutes which, applied to the grooves of automobile pistons, give openings of the order of 0.0004 to 0.0008 inch per face.

For the lower faces of the compression piston ring and its groove, it is of importance that this opening remain very small so that the piston ring may bear on this face of its groove under the effect of the high pressures which it undergoes, subject to a fairly small deformation in order to remain lower than its elastic deformation and so as not to modify in an efficient manner the seat of its outer contact with the cylinder.

For the other small openings, those of the upper contiguous faces of the compression piston ring and its groove and those of the two faces of the oil control piston ring and its groove, there is not the same strict imperative for an important limitation of the opening, because the piston rings never undergo high efforts which might impose upon them deformations which would bring them into contact with the openings of said contiguous faces.

For the upper contiguous faces of the compression piston ring and its groove, experience has shown that a very small opening of 10 to 15 minutes satisfactorily fulfils the mission of access of pressure and this is normal due to the fact that said pressures are high.

For the contiguous faces of the oil control piston rings, the pressures, the access of which is required between them, are much smaller and it may be useful, under certain working conditions, in particular for very high speed engines, to resort to a larger opening between them, so as not to retard or compromise the access of low pressure by a two narrow access circuit.

It is for the same reason that the chamfers or the rounded parts for the admissions to the grooves or any shaping of the angle favourable to the flow of fluids are preferable applied to the grooves of oil control piston rings, because they facilitate the access of the fluids, gas and oil, under low pressure.

Generally speaking, it is an advantage of the invention to offer these possibilities of regulating the pressure access circuits between contiguous faces of piston rings and grooves, to avoid perturbation in the operation of the piston rings on rapid engines.

FIGS. 1, 5, 6 and 7 show various realizations of the orifices of groove bottoms according to the invention. All these orifices utilize the dynamic effect produced on the oil contained in the groove of the oil control piston ring, by the movement of the piston in its downward strokes, to discharge it towards the central cavity of the piston and to avoid finding it in the upper part of the groove where it would beset all the sealing faults of the face and of the upper rim of the oil control piston ring under the effect of its dynamic pressure as is permitted by conventional orifices, as for example the orifice 409 shown in FIG. 4. Such an oil pressure if it is formed may indeed play a harmful role on the consumption of oil during each downward stroke of the piston.

It is in the same spirit that on the one hand the deflection walls 640 (FIG. 6 and 740 (FIG. 7) are disposed to send back towards the central cavity of the piston the projections of oil proceeding from the crank-shaft, in order to protect therefrom the orifices 609 and 709 and that on the other hand the intersection of the orifices for the discharge of oil with the central cavity of the piston is inclined, as is shown by the intersection 741 (FIG. 7) in such a way that during the upward strokes, the lower edge of said orifices runs no risk of collecting the projections through inertia of the oil situated in the top of the hollow cavity of the piston.

The orientations of these orifices for the return of the oil and the deflecting wall placed below, are also beneficial as regards the consumption of oil, if they are applied on all the pistons, to all the orifices for the return of the oil passing through the wall of the piston to terminate in its inner cavity. Such is also the case with the position of the connection of the lower face of these orifices with the wall of the inner cavity of the piston, further away from the centre of the piston, than the position of the connection of their upper face with the wall of the inner cavity of the piston.

Thus, these orifices for the return of the oil from the bottom of the groove according to the invention, increase the efficiency of the satisfactory sealing of the upper contiguous faces of the oil control piston ring and its groove and contribute to the reinforcing of the third particularity imposed by the invention to the oil control piston rings and their grooves.

The operations of the various embodiments or improvements shown in FIGS. 9 to 28 are the following:

The recesses 947 and 1048 of the contacts 917 and 1017, shown in FIGS. 9 and 10 respectively assigned to the lower sealing of the compression piston ring 911 and the upper sealing of the oil control piston ring 1012, increase the permanence of the sealing required for these contacts, by eliminating the markings made after a certain time by the inside angle of the piston ring, or its edge when it is rounded, on the face of the piston groove; these markings are harmful for the sealing because the concentricities of the piston and cylinder vary during operation within the limits of the piston clearance in the cylinder. Thus, the sealing of the compression piston rings 911 and of the oil control piston ring 1012, necessary for the invention, may be improved by these recesses 917 and 1017.

A similar recess 1149 in the upper face of the groove of the compression piston ring and another 1250 in the lower face of the groove of the oil control piston ring shown in FIGS. 11 and 12 may also be provided. It is, however, to be stressed that the improvement in the sealing of the compression piston ring during the intake period of the engine, is not always beneficial because it has previously been seen that at the end of the intake strokes, the depression existing in the space between the two piston rings 1218 contributes, in association with the friction and the pressure of the oil under its lower face, to the maintaining of the oil control piston ring against its upper groove face, against the inertia which tends to separate it therefrom. As regards the recess 1250, it may constitute a means to realize the circle of contact between the lower faces of the oil control piston ring and its groove at the desired spot, at a distance from the outer edge of the piston ring; with a sheet steel oil control piston ring folded in the shape of a "U" (case of the piston ring 1212). This disposition is suitable to ensure tight contacts near the centre of the non perforated part of the faces.

The plastic joints 1351 and 1452 shown in FIGS. 13 and 14, respectively assigned to the lower sealing of the compression piston ring 1311 and the upper sealing of the oil control piston ring 1412, increase the sealing necessary for these contacts by interposing in each of them a joint the plasticity of which is favourable to sealing.

These joints may apply to all forms of contacts, in particular for the compression piston rings shown in FIGS. 2, 3, 8, 9 and 11 and for the oil control piston rings shown in FIGS. 4, 5, 6, 7, 10 and 12.

These joints contribute to the sealing of the face contacts, to that of the slot or slots since they partly mask the same; they also reduce for the same reason the disadvantage of the enlarging of the slots due to wear and finally, taking care to give them a suitable nature and a diameter slightly greater than that of the cylinder, they contribute to the circumferential sealing of the piston rings.

The inventor has also noted that, with "Teflon" joints filled with bronze for example, the wear usually observed on the lower faces of the compression piston ring and its groove was completely eliminated. The slot joints shown in FIG. 15 may be elongated by the opening of their slots 1552-1553 and those of FIG. 16, by deformation of the flaps 1658, without reaching the elastic limit of the material which is low in the case of filled "Teflon," sufficiently to cause them to clear the head or the body of the piston and mount them easily in their groove where they reassume their working dimension, joining slots. The joint does not thus present any breaking of continuity and the increase in the passage of the gas on a cold engine, through the opening of the cut in the joint is eliminated. The disposition of the slots shown in FIG. 16 lends itself moreover to easy operation with a tool provided with alternate cutting punches, each punch simultaneously cutting out two slots spaced apart and in the same direction.

In the embodiment of FIG. 17, the pressure of the combustion chamber acting on the compression piston ring 1711 applies against the lower wall of the groove the collar of truncated section 1759 and this collar consequently receives, due to its plasticity, a radial reaction which applies it against the wall of the cylinder. This truncated collar 1759 fulfils all the objects already described which are assumed by the joint 1351 (FIG. 13) and increases their efficiency in particular as regards the assistance to the circumferential sealing of the compression piston ring, through this application against the wall of the cylinder. It will be noted that with this joint, the second particularity required for the compression piston ring and its groove is realized, either by the angle 1 of the joint slightly smaller than that of its adjacent groove and piston ring faces, which is 1 + 2k, or by the total sealing of said joint with its groove and piston ring faces. The similar joint 1861 of FIG. 18 operates in the same manner with an oil control piston ring 1812, but its radial reaction against the cylinder is much less, because the oil control piston ring never receives any application effort against its upper groove face as high as those undergone by the compression piston ring. It should further be noted that the angular clearances $m$, between the joint 1861 and its groove faces or a sealing fault in the joint between its groove faces are necessary to ensure the first particularity required by the present invention for the faces of the oil control piston ring and its groove.

The small projections 1963 of FIG. 19 and 2064 of FIG. 20 support plastic joints which are mounted respectively with the compression piston ring 1911 and the oil control piston ring 2012 on a piston ring holding head having, as is the usual custom, a clearance of several thousands of an in. in the cylinder to prevent them from extruding between the piston head and the cylinder. These projections are not necessary if the piston heads are,, as is permitted by the invention, brought into contact with the cylinder.

The function of the plastic product layer 2165 adhering to the face of a compression piston ring, shown in FIG. 21, is the same as that of the independent joint 1351 of FIG. 13; it ensures the sealing of the contiguous faces of the piston ring and groove; it is however less efficient, because it leaves open the passage of gas at the cut, but it has the advantage of easy assembling.

The adhering plastic product layer on the ends of the cut, such as shown at 2166 in FIG. 21a, reduces the leak through the cut and if it is of sufficient thickness, it adjusts itself automatically by extrusion so as to reduce the width of the cut to the minimum necessary to permit the expansion of the piston ring in the most unfavourable case. In fact, when the cut in the piston ring closes under the effect of the expansion, the plastic product in excess extrudes out of the cut and leaves on each face of the cut the maximum thickness of plastic layer that may be borne by the piston ring, which reduces to a minimum the leakage flow from the cut.

The various joints shown in FIGS. 22, 23, 24, 25 and 26 contribute to the sealing of the compression piston ring by bringing aid, on the one hand to the sealing of the contiguous lower and/or upper piston ring and groove faces, on the other hand to the application of the piston ring against the cylinder, but their most important function is to bring a remedy to the unexpected phenomenon of oil pumping, observed by the inventor, during tests with compression piston rings which presented a very high sealing of their lower face.

The pumping of oil positively sends oil towards the top of the cylinder; this has been observed even with oil control piston rings of very high efficiency. After close observations, the inventor gives the following explanations:

During each intake stroke, the compression piston ring which is applied against the upper face of its groove opens along its lower face the clearance with which it is mounted in its groove and, by the path thus opened, the oil proceeding from the layer scraped on the cylinder by the compression piston ring penetrates into the bottom of the groove. With an efficient oil control piston ring, the quantity of oil thus sent into the bottom of the groove at each intake stroke is very small, but is however positive. So long as the lower contiguous faces of the compression piston ring and its groove do not have a very efficient sealing, this very small quantity of oil is sent back to the bottom of the groove, under the compression piston ring, to the cylinder, during each power stroke of the piston, by the effect of the gaseous current which constitutes the blow-by and this small to and fro movement of the oil passes unperceived in the operation of the engine. On the contrary, with the piston ring system according to the invention in which the sealing is very efficient, each trace of oil which has access to the bottom of the groove during the intake strokes is trapped and can no longer back out; however small the trace of trapped oil, upon each cycle, the repetition of the phenomenon produces an output which cannot be neglected. This oil first of all fills the bottom of the groove and is then driven towards the top of the piston between the upper contiguous piston ring and groove faces. This positive pumping of the oil in the direction crankcase/ explosion chamber is obviously harmful and incompatible with the object of the invention.

The remedy for this disadvantage, according to the invention, includes three means: the first and the most important which is connected with the invention is the one defined by the first to fourth particularities of the oil control piston ring which, while ensuring a very satisfactory control of the oil film left on the cylinder during the downward strokes of the piston, dries up at the source the above mentioned puming effect; the second and third which are optional, consist in associating with the piston-piston ring unit, either together or separately, on the one hand a sealing joint, placed between the bottom of the groove and the piston ring of which FIGS. 22 to 26 show examples, in order to oppose the passage of the pumped oil, on the other hand a suitable profile of the outer wall of the compression piston ring, in order to obtain, through the known effect of corner oil, the recyling, along the walls of the cylinder, of the oil proceeding from the bottom of the groove which is thus pumped above the compression piston ring.

The different profiles shown in FIGS. 22 to 25 fulfil this purpose. The cone 2285 of FIG. 22 recycles in a satisfactory manner but if it is narrow, a fraction of a degree, it disappears fairly quickly through wear and if it is wide, from 1° to 5° for example, it leaves at the top of its stroke on the cylinder a non recycled band of oil proceeding from the angular space 2286. The symmetrical curved profile 2385 of FIG. 23 attenuates the above disadvantage; the curved profile with downward contact 2485, (FIG. 24) permits a piston ring 2411 which bears, while deforming itself, on a slightly inclined lower face 2417, to preserve at the top a recycling angle during the deformation of the piston ring; finally, the curved profile with upward contact 2585 (FIG. 25) is the one which, while recycling like the others, leaves the smallest band of oil on the cylinder, due to the diminutiveness of the angular space 2586.

Hereafter is explained the behaviour of the various joints shown in FIGS. 22 to 26 reducing or stopping this oil pumping. The toric joint 2267 (FIG. 22) has revealed itself efficient against the pumping of oil under high running conditions but of lesser efficiency under low running conditions. The explanation of this particularity has not been established with certainty; it would seem that it is due to the fact that under high running conditions the toric joint maintains, during the four periods of the cycle, its position flattened against the lower walls of the bottom of the groove during ignition, whereas under low running conditions it would have time to recover its roundness. Thus, under high running conditions, it would obstruct the whole passage between the bottom of the groove and the top of the cylinder which the oil pumped through the cut in the piston ring could follow and would free the bottom of this passage under lower running conditions.

The joints the section of which comprises several contact members connected to the same body, such as those shown in FIGS. 23, 24, 25 and 26 have a more stable behaviour between high and low running conditions, probably due to the fact that they all have a permanent sealing contact, against the inner face of the compression piston ring, placed very near to the lower face of said piston ring, which obstructs the discharge path for the pumping oil through the cut in the piston ring at its origin, at the lower angle of the piston ring or very near said origin, at the points 2387 (FIG. 23) 2487 (FIG. 24) and 2587 (FIG. 25). Moreover, these joints lend themselves better, through their less compact structure, to an assembly under compression between piston ring and groove joint sufficient to remain efficient upon increase of the distance between inner wall of the piston ring and the groove bottom under the effect of wear, without being excessive when the piston ring and the cylinder are new.

The joint 2368 (FIG. 23) has the above advantages and those which are known in this type of joint. It ensures satisfactory sealing as well as against the passage of gas as against oil pumping.

The joint 2469 (FIG. 24) adds to the advantages of the preceding one increased efficiency against oil pumping due, on the one hand, to the permanent contact between its lower rim and the lower limit of the inner face of the piston ring at 2487, on the other hand, to the rim contact which is favourable to the sealing of a passage of fluid with very low output and pressure, which are the oil pumping conditions which must be stopped.

The joint 2570 (FIG. 25) unites the advantages of the joint 2469 against the pumping of the oil and the joints 2368 and 2469 against the passage of gas. Its rim 2574, flexible, has a particular aptitude to impose an efficient sealing against the pumping of oil and to follow the effects of wear of the piston ring and cylinder under a very reduced application force against the piston ring.

A joint comprising one or several bands, such as the one shown in FIGS. 26, operates like the preceding ones; the band 2676 facing the bottom of the inner face of the compression piston ring opposes itself efficiently to the pumping of the oil and it is very apt to follow the wear of the piston ring.

The joint occupying almost the whole volume in the bottom of the groove between the piston-ring and the piston, reduces small dead spaces offered to combustible gas and, for that reason, as it is known, contributes to the reduction of atmospheric pollution, while assuming all the missions already described for the preceding joints.

Finally, all joint designs ensuring one or several circular sealing joints between the bottom of the groove and the inner face of the compression piston ring whether they have sealing contacts of any shape, flaps, rims, bands, geometrical or not, may ensure, in accordance with the invention, the reduction of oil pumping and of the passage of gas under the compression piston ring.

These flexible joints of rubber, gripped between the piston ring and the bottom of the groove, the operation of which has just been explained with regard to the consumption of oil, further bring forward three new incidental effects.

On the one hand, they push the piston ring against the wall of the cylinder by applying thereto an effort which is tributary to the nature of the joint and of the clamping to which it is subjected and which is very uniformly distributed. This effort, according to its importance, may assist or replace the tension of the piston ring. It thus permits, when it is sufficient, the use of a more simple and less fragile piston ring, that is to say manufactured with other materials than cast iron and allied steels at present employed, for example carbon steel which has been up to now eliminated from such use due to its loss of elasticity at operating temperatures and machined to simple shapes with a diameter approximately that of the cylinder instead of machinings of intricate geometry imposed by the search for a piston ring tension equally distributed over its whole periphery by the sole fact of its elasticity.

These groove bottom joints in flexible rubber maintain the piston head and contribute to its mechanical behaviour. In particular, they avoid slapping of the piston observed on certain engines, when cold, or after a certain degree of wear of the pistons and cylinders.

These joints stop, when their clamping is sufficient, the rotation of the compression piston rings. This is a factor which favours the adaptation of the piston rings by grinding to deformations and cylinder wear. Compression piston rings thus stopped in their rotation have shown a reduction of wear in operation of their faces and of that of their grooves.

These joints participate in the reduction of the small dead spaces between the piston-ring and the bottom of the groove and contribute therefore to the diminution of unburnt gas which are an important element of the atmospheric pollution.

The operation of the oil control piston ring shown in FIG. 27 with a joint retained by the recess 2778 is in all point identical to the operation of the different types of oil control piston rings, whether they be of fixed height or with rails applied elastically against their contiguous groove faces, provided with a sealing joint between the upper contiguous piston ring and groove faces, but it has been observed in the course of testing such joints that under the conditions of high temperatures and abundant lubricating which are imposed thereon during operation, the joint lost its rigidity and had a tendency, under the thrust of the blow-by pressure to insinuate itself into the bottom of the groove.

The small recess 2778 made in the face of the groove resists the sliding of the joint and avoids the disadvantage observed.

The operation of the groove shown in FIG. 28 is the following: when it is associated with the groove of an oil control piston ring, its sharp angle attacks the oil film during the downward strokes of the piston and puts oil in reserve; during the upward strokes of the piston, it returns this oil to the cylinder through the corner of oil effect produced by its rim 2880. Moreover, it may cooperate with the oil control piston ring to retard the moment of opening of the oil passage. In fact, considering that the peak of the gaseous leakage output which the oil control piston ring must discharge is situated near to the high dead point, and that, on the contrary, the maximum output of the scraped oil to be discharged is situated much nearer the middle or the bottom of the piston stroke, the said groove combined with the floating scraper may stock the oil at the moment of the highest gaseous output — the first third of the stroke — and cause the oil control piston ring to float only after this moment. In other words, the presence of this groove may on the one hand attenuate the necessary clearance for the gas and oil output which the oil control piston ring must discharge to the crankcase during the powerperiod, on the other hand return to the cylinder the oil placed in reserve to lubricate the skirt when it rises on the part of the cylinder dried by the scraping.

The explanation of the operation of said groove in combination with the groove of a compression piston ring is described with the operation of the piston shown in FIG. 29.

When the passage of the gas or blow-by is restricted to a fairly low value, the normal clearance between the piston and the cylinder offers a sufficient discharge passage and the piston may remain free between its two piston rings, as in the case of FIG. 1.

If on the contrary, taking into account the ageing of the engine, this gaseous rush is or may become sufficient to perturb the satisfactory mechanical behaviour of this extension of the skirt between the two piston rings, the gas passages are then canalized by the groove 2983 (FIG. 29) which may advantageously be of the type described in FIG. 28. It thus adds the function of pre-scraping and lubrication previously described to the role of collector of the leaks from the compression piston ring, and the gaseous rush thus canalized is conducted by the conduits 2984 above the oil control piston ring in the space provided by the chamfer 2985.

The explanation of the operation and the experience of the units constituted by a piston, a compression piston ring and an oil control piston ring, according to the invention, make it evident that such units assign to each of these two piston rings associated with their grooves, by certain positive means, in each circumstance of a four period cycle, well determined roles, the reproductiveness of which is permanent; it is a logical consequence of the positive character of the means employed.

Hereunder is a brief enumeration of the advantages which result therefrom.

The sealing of the piston in its cylinder is increased, for example, on a vehicle provided with an explosion engine of 0.07 cu. in., the following comparisons have been observed:

|  | Conventional piston-piston ring unit | Piston-piston ring unit according to the invention | Differences |
|---|---|---|---|
| Pressures read under heat on compression meter for a voumetric ratio of 8.5 to 1 in lb/sq.in | 165 | 200 | +20% |
| Value of Blow-by at idle speed in gallons per minute | 0.9 | .15 | −82% |
| Value of blow-by at full working speed, full load in gal/min. | 4/4.5 | 0.78/1 | −79% |

This considerable increase in the sealing of the piston in its cylinder ensures, on the one hand, an improvement in the thermal efficiency of the cycle by the reduction or the elimination of the waste fuel gases which pass from the explosion chamber into the crankcase, on the other hand, the reduction of the atmospheric pollution of automobile engines circulating in cities, through the improvements in combustion at very low loads; in particular under idle speed conditions, they are much less regular. Under these working conditions, in fact, one frequently observes misfires in the ignition due to the fact that the pressures reached at the moment of ignition are low and that the sealing faults cause certain to fall below the point of inflammability. The tight sealing of the compression piston regularizes the pressures and thus reduces the unburnt products contained in the exhaust gases.

Moreover, recent experiences have brought to light the harmful action of the recycling of the crankcase gases on the steadiness of the adjustments of the carburettor and the quality of the lubricating oils.

The reduction of the recycled gases reduces to the same extent these disadvantages. Further, with a large experience in the application of the invention, one will not fail to realize further progress which will increase this reduction. This is an entirely new development in the protection of mechanical elements and lubricating oils of internal combustion engines against the damage created by the passage of the gases.

This increase of the pressure obtained, with the same volumetric ratio, has moreover for effect to widen the conditions favourable to ignition and, for this reason, to facilitate considerably cold starting of engines.

It must also be noted that the reduction of the passage of gas between the piston and the cylinder protects very efficiently the piston rings against clogging.

The invention comprises furthermore a new lubricating cycle for the piston and in particular for the tops of the cylinder. Indeed, due to the fact that the oil which clears the scraping and remains on the top walls of the cylinder, rotates partly about the compression piston ring, and is then recycled towards the crankcase during the upward strokes of the piston through the action of the oil control piston ring and its widely open groove clearance, one may allow more oil to pass to the control of the oil control piston ring than in a conventional system which recycles badly or not at all, without for that matter consuming more. Further, the oil which lubricates the tops of the cylinder is no longer isolated oil exposed to the degradations of an oil not renewed and burnt, it renews itself and retains its quality at the level of that of the crankcase. This new lubricating cycle for the tops of the cylinder has the advantage of permitting, while preserving, an excellent mechanical condition of the members present: cylinder, pistons and piston rings, high economy in oil.

The elimination of a piston ring as well as the establishment of the mechanical contact throughout the height of the piston, permit of reducing the total height of the piston. On the one hand, its head may be reduced by the eliminated heights of the piston ring and of the cylindrical band. For example, for automobile engines this reduction in height is of the order of 0.2 to 0.4 inch. On the other hand, the rising of the rubbing part of the skirt up to the head of the piston, in addition to the better mechanical behaviour of the piston in the cylinder already noted, permits, for an equal friction surface between the cylinder and the piston, of also reducing, by shortening from the base, the height of the piston skirt.

Each of these reductions in the height of the piston, whether they be applied together or separately, permits of economizing the considered height, applied not only to the piston but also to the engine. Thus, with an equal cylinder displacement, it is a transverse section of the engine, of the order of 0.2 to 0.6 inch for automobile engines that the invention permits of economizing. There results a lightening of the weight of the alternating movable members favourable to performances, a lightening of the engine, improved housing possibilities and an appreciable economy in cost.

Finally, the elimination of a piston ring, the reduction of the tension of the oil control piston ring, enumerated in the course of the description, cooperate to reduce the friction of the piston ring system on the cylinder the results of which are an improvement in power and reduction in wear.

These piston and piston ring units have the further advantage of readily lending themselves by various adjusting means to the setting of each of the parameters which permit of adapting them in a satisfactory manner to the particular requirements of each engine. Thus, piston rings and grooves of the type shown in FIG. 8 for the compression piston ring and its groove or FIG. 6 for the oil control piston ring and its groove, permit of modifying, by displacement of the intersection between the parts of the groove faces parallel to the piston ring and the parts of the slightly open groove faces, the required action of the pressures between each contiguous piston ring and groove face. The modification of the openings between contiguous faces and, if need be, the adding at their groove entrance of chamfers or rounded parts, more or less important, modify the rapidity with which the required action of the pressures intervenes on the faces, and the clearances of the oil control piston ring in the groove modify the levels of the pressures around its faces.

The various parameters which control the operation of the piston and piston ring units, in particular the pressures between the two piston rings, the hydraulic pressure under the oil control piston ring and the pressure of the oil control piston ring on the cylinder, may thus be adapted to the various characteristics of each engine in particular to its stroke, its volumetric ratio, its running conditions and its load rate. Finally, for the oil control piston ring, the action on the clearance of the piston ring in its groove, on the surface of the sections of each of its faces which is offered to the action of the pressure and on the dispositions and sections of the fluid accesses to the faces of the piston ring, will permit of determining the lowest tension of the piston ring which may remain above that of the fluids, gas or oil which will present themselves at various moments of the cycle on one or other of said faces; this process leads to a reducing to a minimum the tensions of the oil control piston rings, thus the wear of the piston rings and cylinders and the losses in power by friction.

Thus, in the light of verifications already effected, it is clear that the present invention potentially contains entirely new possibilities for present internal combustion engines, on the one hand, to reduce their weight, bulk, cost, mechanical wear and their contribution against atmospheric pollution, on the other hand, to improve their performances, the conditions and the stability of their adjustment.

Of course, the invention concerns more particularly, by way of new industrial products, piston-piston ring units with only two piston rings, one for compression and one for oil control, according to the arrangements provided by the invention. It also however, concerns, on the same grounds, piston-piston ring units which would comprise a greater number of piston rings and in particular piston-piston ring units comprising at least one combination piston groove-piston ring, according to the invention, and at least one combination piston conventional groove-piston ring.

In a general manner, the above description has been given only by way of indication and is in no way limitative and the invention may undergo various modifications in conformity with its spirit.

I claim:

1. A piston and compression and oil control piston rings unit for internal combustion engines comprising an open skirt hollow type piston, in a cylinder delimiting a combustion chamber with its head and said piston, compression ring and oil control ring grooves in said piston and metal rings in said grooves, said rings having their outwardly radial position limited only by their contact to the cylinder, and said rings and grooves having axially spaced faces, characterized by an efficient sealing means provided between at least one ring face and the contiguous face of its groove by interposing plastic sealing joint between said faces which is subjected to a variable sealing force including a force proportional to fluid pressures including any conbustion pressures acting on said ring.

2. A piston and piston ring unit for internal combustion engines comprising in an open skirt hollow type cylinder a piston having compression ring and oil control ring grooves and metal rings in grooves characterized by an efficient sealing means provided between at least one face of at least one compression ring and the contiguous face of its groove, the aforesaid contiguous faces of ring and groove being defined at their outside diameter by the cylinder, the sealing means being provided between said contiguous faces by interposing a plastic sealing joint between said faces which is subjected to a variable sealing force increasing with combustion chamber pressure including any combustion pressures acting on said compression ring.

3. A unit according to claim 1 wherein the sealing joint includes radial cuts extending from the inner and outer peripheries of the sealing joint and wherein the cuts extend less than the full radial width of the sealing joint.

4. A unit according to claim 1 in which the groove face contiguous to said sealing joint includes a circumferential step and wherein said sealing joint is located outwardly of said step.

5. A unit according to claim 1 in which the sealing means adheres to at least one face of at least one pair of contiguous piston ring and groove faces.

6. A unit according to claim 1 wherein the ring adjacent said sealing means includes a gap and in which the sealing means includes sealing material adhering to at least one contiguous surface of the ring gap.

7. A unit according to claim 1 in which the sealing means constitutes a sealing joint having a trapezoidal cross section and wherein said contiguous faces of said sealing joint and groove are inclined to the cylinder wall.

8. A unit according to claim 1 in which the sealing means includes an hydrocarbon, combustion temperature, friction, crushing, extrusion and ageing resistant material.

9. A unit according to claim 8 in which the sealing means includes a fluorocarbon polymer such as polytetrafluoroethylene.

10. A unit according to claim 1 in which the piston outside wall adjacent the groove face contiguous with said sealing joint includes a circumferential supporting flange extending into the clearance between the piston wall and cylinder wall and said contiguous groove face extends across said flange to support said sealing joint.

11. A unit according to claim 1 wherein said sealing joint circumferentially contacts said cylinder wall.

12. A unit according to claim 1 wherein said sealing means prevent fluid pressure acting on one face of a ring from access to the opposite face of the same ring.

13. A unit according to claim 1 wherein said piston and rings unit includes only one compression ring groove and ring in the groove with said sealing means interposed between at least one contiguous pair of faces of said compression ring and said groove.

14. A unit according to claim 1 wherein the surface of a compression ring, contiguous with the cylinder wall comprises a non-cylindrical surface of revolution symmetric about the piston axis and wherein said surface is specially adapted to recycle upper cylinder oil.

15. A unit according to claim 1 including piston skirts on said piston and in bearing mechanical contact with said cylinder and wherein the bearing mechanical contact of the piston skirts with the cylinder wall extends above the oil control piston ring.

16. A unit according to claim 1 wherein said piston wall includes a circumferential scavenging groove adjacent a ring groove and more remote from said combustion chamber than said ring groove.

17. A unit according to claim 16 wherein said piston wall includes axially directed grooves communicating between said scavenging groove and said oil ring grooves.

18. A unit according to claim 1 including access means for access of fluid pressure existing between piston and cylinder, between at least a substantial portion of at least one pair of the contiguous faces of at least one piston ring and its groove.

19. A unit according to claim 18 in which said access means is provided by an opening of said contiguous piston ring and groove faces towards the exterior of the piston.

20. A unit according to claim 19 wherein said access means is sufficiently limited to prevent deflection of said piston ring beyond the elastic limit of said piston ring.

21. A unit according to claim 18 in which said access means is provided by a relatively rough surface of at least one of said contiguous approximately parallel piston ring and groove faces.

22. A unit according to claim 18 wherein at least one face of the groove includes a circumferential recess extending radially outwardly from the groove bottom beyond the inner periphery of the ring.

23. A unit according to claim 18 in which said sealing contact between contiguous piston ring and groove faces is located on a portion of the piston ring face, adjacent the inner periphery of the ring.

24. A unit according to claim 23 wherein said sealing contact is located on at least one pair of contiguous piston ring and groove faces on the conbustion chamber side.

25. A unit according to claim 23 wherein said sealing contact is located on at least one pair of contiguous piston ring and groove faces on the crankcase side.

26. A unit according to claim 1 wherein a groove bottom joint is interposed between the inner periphery of a compression ring and the bottom of the compression ring groove.

27. A unit according to claim 26 wherein the bottom joint includes a hydrocarbon, combustion, temperature and age resisting material.

28. A unit according to claim 27 wherein the bottom joint includes a fluorated elastomer.

29. A unit according to claim 26 wherein the bottom joint includes a resilient material preloaded upon installation to assure radial pressure against the inner periphery of said compression ring.

30. A unit according to claim 26 wherein said bottom joint is substantially circular in cross-section.

31. A unit according to claim 26 wherein said bottom joint comprises four lobes in cross-section.

32. A unit according to claim 26 wherein said bottom joint is quadrangular in cross-section.

33. A unit according to claim 32 wherein said bottom joint includes resilient joint material having expansion accommodating bubbles.

34. A unit according to claim 18 including oil relief passages extending inwardly from the piston wall on the crankcase side of the oil control ring and groove and communicating with the piston interior, wherein the oil control ring is of fixed height, the axial clearance of the oil control ring in the groove allows sufficient fluid flow to limit the maximum fluid pressure in the clearance between the piston wall and cylinder wall on the combustion chamber side below the contact pressure of the oil control ring against the cylinder wall and the axial clearance is limited to maintain the minimum pressure in the clearance between the piston wall and cylinder wall on the combustion chamber side above the dynamic pressure of fluid in the groove bottom.

35. A unit according to claim 18 wherein the face of the oil control ring groove on the crankcase side is circumferentially continuous, the oil control ring is of fixed height, the axial clearance of the oil control ring in the groove allows sufficient fluid flow to limit the maximum fluid pressure in the clearance between the piston wall and cylinder wall on either side of the oil control ring below the contact pressure of the oil control ring against the cylinder wall and the axial clearance is limited to maintain the minimum pressure in the clearance between the piston wall and cylinder wall on the combustion chamber side above the dynamic pressure of fluid in the groove bottom.

36. A unit according to claim 18 wherein a variable height oil control piston ring is characterized by discontinuities on at least one face contiguous to a groove face and adjacent the outer periphery of the oil control ring.

37. A unit according to claim 18 including a variable height oil control ring and characterized by face discontinuities on at least one groove face adjacent the piston wall and contiguous to a face of the oil control ring.

38. A unit according to claim 18 including oil relief passages extending inwardly from the piston wall on the crankcase side of the oil control ring and groove and communicating with the piston interior, a variable height oil control ring in the oil control ring groove, whereby the maximum axial clearance of the oil control ring in the groove allows sufficient fluid flow to limit the maximum fluid pressure in the clearance between the piston wall and cylinder wall on the combustion chamber side below the contact pressure of the oil control ring against the cylinder wall, whereby the pressure of the fluid flowing through the axial clearance opposes the expanding force of the variable height oil control ring to determine the axial clearance, and whereby the axial clearance is limited to maintain the minimum pressure in the clearance between the piston wall and cylinder wall on the combustion chamber side above the dynamic pressure of fluid in the groove bottom.

39. A unit according to claim 18 wherein the face of the oil control ring groove on the crankcase side is circumferentially continuous, the oil control ring is of variable height and whereby the maximum axial clearance of the oil control ring in the groove allows sufficient fluid flow to limit the maximum fluid pressure in the clearance between the piston wall and cylinder wall on either side of the oil control ring below the contact pressure of the oil control ring against the cylinder wall, whereby the pressure of the fluid flowing through the axial clearance opposes the expanding force of the variable height oil control ring to determine the axial clearance, and whereby the axial clearance is limited to maintain the minimum pressure in the clearance between the piston wall and cylinder wall on the combustion chamber side above the dynamic pressure of the fluid in the groove bottom.

40. A unit according to claim 1 including an interior cavity in said piston, oil orifices which extend inwardly from the oil control ring groove bottom communicate with the piston interior cavity, and wherein the walls of the orifices adjacent the groove face on the combustion chamber side slope toward the combustion chamber from the groove face to the piston interior cavity.

41. A unit according to claim 1 including an interior cavity in said piston, oil orifices which extend inwardly from the oil control ring groove bottom and communicate with the piston interior cavity and wherein a wall of the interior cavity is directed inwardly and toward the combustion chamber, whereby the oil orifices issue into the interior cavity closer to the combustion chamber than at least a portion of the interior wall.

42. A unit according to claim 1 including an interior cavity in said piston, and oil orifices which extend inwardly from the oil control ring groove bottom and communicate with the piston interior cavity.

43. In a piston and ring assembly for use in an internal combustion engine wherein a piston includes a head and a cylindrical body portion having means for mounting the piston on a connecting rod for reciprocating movement in a cylinder, said body portion of said piston including at least one compression ring groove between said head and said means for connecting a rod, a metallic compression ring received in said groove, said metallic compression ring including radially disposed spaced faces which are in essentially parallel relationship, the improvement comprising at least one auxiliary compression ring associated with said metallic compression ring, said ring groove including at least one radially disposed inclined face, said auxiliary compression ring being a continuous annular wedge ring of a filled fluoro-carbon resin and having an inner peripheral dimension less than the outer peripheral dimension of the ring groove but greater than the peripheral dimension of the base of said ring groove thereby forming a space between the inner peripheral surface of said wedge ring and the base of said groove, the said auxiliary compression ring including a continuous generally annular surface portion in sealing engagement with the opposed surface of the corresponding compression ring for providing a continuous gas seal therewith during reciprocating movement of said piston and an inclined face in sealing engagement with the radially inclined face of said ring groove during reciprocating movement of said piston, and the said auxiliary compression ring including a continuous outer peripheral surface free of radial seams and joints and having a dimension measured axially which is greater than the axial dimension of the inner periphery for reception in conformational gas sealing relation with a cylinder.

44. A piston and ring assembly as set forth in claim 43 wherein said piston includes two axially spaced compression ring grooves each of which receives a metallic compression ring, and wherein said metallic compression rings and said auxiliary compression rings are so arranged that said auxiliary compression rings are spaced from each other by said metallic compression rings.

45. A piston and ring assembly as set forth in claim 43 wherein said fluorocarbon resin is filled polytetrafluoroethylene.

46. A piston and ring assembly as set forth in claim 43 wherein two auxiliary compression rings and one metallic compression ring are received in each compression ring groove, and each auxiliary compression ring including a face in sealing relation with the opposed faces of said metallic compression ring.

47. A piston and ring assembly as set forth in claim 43 wherein said auxiliary ring is trapezoidal in cross-section.

48. A piston and ring assembly as set forth in claim 45 wherein the said metallic compression ring operates as an expander during movement of said piston to urge the corresponding auxiliary ring into sealing engagement with said piston and cylinder, and wherein the said auxiliary piston ring is of filled polytetrafluoroethylene.

* * * * *

PO-1050
(5/69)

UNITED STATES PATENT OFFICE
CERTIFICATE OF CORRECTION

Patent No. 3,759,148   Dated September 18, 1973

Inventor(s) ROBERT GEFFROY

It is certified that error appears in the above-identified patent and that said Letters Patent are hereby corrected as shown below:

Column 5, line 63, insert --one-- between "applied against"

Column 10, line 33, correct "leel" to --level-- line 63, correct "permit" to --present--

Column 12, lines 56, 57, delete the repetition of "The joint 2469 --- joining flaps."

Claim 1, column 28, line 9, insert --a-- between "interposing plastic"
Claim 1, column 28, line 12, correct "conbustion" to read --combustion--

Claim 2, lines 15, 16, correct to read --tion engines comprising in a cylinder an open skirt hollow type piston having compression ring and oil con- Claim 48, column 32, correct "45" to read --43--

Signed and sealed this 25th day of December 1973.

(SEAL)
Attest:

EDWARD M. FLETCHER, JR.
Attesting Officer

RENE D. TEGTMEYER
Acting Commissioner of Patents